US 12,550,995 B2

(12) United States Patent
Han et al.

(10) Patent No.: US 12,550,995 B2
(45) Date of Patent: Feb. 17, 2026

(54) MOTOR ASSEMBLY AND HAIR DRYER HAVING SAME

(71) Applicant: LG ELECTRONICS INC., Seoul (KR)

(72) Inventors: Cheol Han, Seoul (KR); Giyeob Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 646 days.

(21) Appl. No.: 18/016,222

(22) PCT Filed: Jan. 27, 2021

(86) PCT No.: PCT/KR2021/001052
§ 371 (c)(1),
(2) Date: Jan. 13, 2023

(87) PCT Pub. No.: WO2022/019421
PCT Pub. Date: Jan. 27, 2022

(65) Prior Publication Data
US 2023/0270226 A1      Aug. 31, 2023

(30) Foreign Application Priority Data

Jul. 20, 2020    (KR) ........................ 10-2020-0089793

(51) Int. Cl.
*H02K 11/33*       (2016.01)
*A45D 20/12*      (2006.01)
(Continued)

(52) U.S. Cl.
CPC ............ *A45D 20/12* (2013.01); *H02K 5/1732* (2013.01); *H02K 5/24* (2013.01); *H02K 7/083* (2013.01);
(Continued)

(58) Field of Classification Search
CPC .... A45D 20/12; H02K 2211/03; H02K 21/16; H02K 7/083; H02K 5/24; H02K 5/1732; H02K 11/33
See application file for complete search history.

(56) References Cited

U.S. PATENT DOCUMENTS

2017/0170709 A1    6/2017   Barnes et al.
2017/0211727 A1*   7/2017   Peng ................... B29C 66/1224
(Continued)

FOREIGN PATENT DOCUMENTS

CN         207782511 U      8/2018
CN         109639030 A      4/2019
(Continued)

*Primary Examiner* — Terrance L Kenerly
(74) *Attorney, Agent, or Firm* — Birch, Stewart, Kolasch & Birch, LLP

(57) ABSTRACT

The present invention relates to a motor assembly and a hair dryer having same. The motor assembly of the present invention comprises: an impeller; an outer housing and an inner housing arranged concentrically; a stator accommodated inside the inner housing; a rotor disposed inside the stator; a bearing supporting a rotary shaft of the rotor; a bracket having a bearing accommodating part in which the bearing is accommodated, and a plurality of bridges which are spaced apart from the outer surface of the bearing accommodating part in a circumferential direction thereof and protrude in an axial direction thereof so as to be coupled to the inner housing; and a vortex suppressing part blocking empty spaces between the plurality of bridges so that generation of air vortices can be suppressed. Thereby, it is possible to suppress vortex generation in a downstream region of the impeller, and flow loss caused by the vortex generation can be reduced.

19 Claims, 18 Drawing Sheets

(51) Int. Cl.
*H02K 5/173* (2006.01)
*H02K 5/24* (2006.01)
*H02K 7/08* (2006.01)
*H02K 21/16* (2006.01)

(52) U.S. Cl.
CPC ............ *H02K 11/33* (2016.01); *H02K 21/16* (2013.01); *H02K 2211/03* (2013.01)

(56) References Cited

U.S. PATENT DOCUMENTS

| | | | | |
|---|---|---|---|---|
| 2021/0235951 A1* | 8/2021 | Hwang | ................. | F04D 29/444 |
| 2021/0288549 A1* | 9/2021 | Kim | ...................... | H02K 11/33 |
| 2022/0069665 A1* | 3/2022 | Noh | ......................... | H02K 5/24 |

FOREIGN PATENT DOCUMENTS

| | | |
|---|---|---|
| EP | 3 343 043 A1 | 7/2018 |
| GB | 2545269 A | 6/2017 |
| JP | 2003-143797 A | 5/2003 |
| JP | 2018-84151 A | 5/2018 |
| JP | 2018-105269 A | 7/2018 |
| KR | 10-1947453 B1 | 2/2019 |

\* cited by examiner

MOTOR ASSEMBLY AND HAIR DRYER HAVING SAME

CROSS REFERENCE TO RELATED APPLICATIONS

This application is the National Phase of PCT International Application No. PCT/KR2021/001052, filed on Jan. 27, 2021, which claims priority under 35 U.S.C. 119(a) to Patent Application No. 10-2020-0089793, filed in the Republic of Korea on Jul. 20, 2020, all of which are hereby expressly incorporated by reference into the present application.

TECHNICAL FIELD

The present disclosure relates to a motor assembly and a hair dryer having the same.

BACKGROUND ART

As is well known, a motor is a device that converts electrical energy into mechanical energy. A motor typically includes a stator and a rotor disposed inside or outside the stator to be rotatable.

Among others, an important thing in a motor applied to a so-called handheld device or handheld equipment (hereinafter, referred to as a "handheld device") used by hand is to reduce a size in consideration of handling convenience.

The motor applied to the handheld device, for example, a hair dryer and/or a cleaner, includes an impeller to promote a movement of air or to generate pressure.

A motor assembly having the impeller includes an outer housing for accommodating the impeller, an inner housing concentrically disposed inside the outer housing and defining an air flow path therebetween, a plurality of vanes connecting the outer housing and the inner housing, and a stator and a rotor accommodated in the inner housing.

On the other hand, if the motor assembly having the impeller is miniaturized by reducing size and weight, a high-speed rotation of the motor assembly having the impeller is required to maintain the same level of air flow.

However, in the related art motor assembly having the impeller, when a bearing is disposed on one side of the rotor, a lateral displacement of the rotor is increased. In particular, when operating at high speed (rotation), the lateral displacement is further increased, which drastically shortens a lifespan of the bearing.

In consideration of this problem, when bearings are installed on both sides of the rotor, a separate bracket for supporting the bearing is provided on one side of the rotor in an axial direction. The separate bracket includes a bearing accommodating portion for accommodating a bearing, and a plurality of bridges that are spaced apart in a circumferential direction of the bearing accommodating part and extending in the axial direction.

However, in the related art motor assembly having the impeller, when the impeller rotates, air moved to the bracket generates a vortex between the plurality of bridges of the bracket, which causes an increase in flow loss.

The vortex between the plurality of bridges of the bracket also causes an increase in vibration and noise.

PRIOR ART DOCUMENT

Patent Document (Patent Document 1) US20170170709 A1

DISCLOSURE OF INVENTION

Technical Problem

Accordingly, one aspect of the present disclosure is to provide a motor assembly capable of suppressing a vortex generation in a downstream region of an impeller and reducing flow loss due to the vortex generation, and a hair dryer having the same.

Another aspect of the present disclosure is to provide a motor assembly capable of suppressing an addition of components and suppressing a vortex generation, and a hair dryer having the same.

Still another aspect of the present disclosure is to provide a motor assembly capable of suppressing a vortex generation and promoting cooling of a stator coil, and a hair dryer having the same.

Solution to Problem

To achieve those aspects and other advantages of the present disclosure, there is provided a motor assembly that may include bearings disposed on both sides of a rotor in an axial direction, and vortex suppression parts each configured to suppress a vortex generation by blocking an empty space of a bracket that supports a half-load-side bearing.

Specifically, an impeller and an inner housing may be disposed inside an outer housing, a stator and a rotor may be disposed inside the inner housing, a bracket having a bearing accommodating portion for accommodating a bearing and a plurality of bridges spaced apart from one another in a circumferential direction of the bearing accommodating portion may be disposed on one side of the rotor, and vortex suppression parts may be disposed to block empty spaces between the adjacent bridges, which may result in suppressing a vortex generation due to the bracket when air moved by the impeller passes through the bracket.

This can reduce flow loss due to the vortex generation, and suppress an occurrence of noise due to the vortex generation.

The impeller may be disposed at one side in the outer housing, and the inner housing may be concentrically disposed with the outer housing at one side of the impeller in the axial direction.

An air flow path through which air moves when the impeller rotates may be defined between the outer housing and the inner housing.

A plurality of vanes for guiding the movement of air may be disposed between the outer housing and the inner housing.

The motor assembly may include an impeller, an outer housing in which the impeller is accommodated at one side, an inner housing concentrically disposed inside the outer housing and having an air flow path defined outside thereof, a stator accommodated in the inner housing, a rotor accommodated in the stator and rotating the impeller, a bearing supporting a rotating shaft of the rotor, a bracket having a bearing accommodating portion in which the bearing is accommodated, and a plurality of bridges axially protruding from an outer surface of the bearing accommodating portion with being spaced apart from one another in a circumferential direction, so as to be coupled to the inner housing, and vortex suppression parts each configured to block an empty space between the bridges adjacent to each other to suppress a generation of vortex of air moved toward the bracket due to the rotation of the impeller.

Here, the inner housing and the bracket may be formed of a metal member.

The inner housing and the bracket may be made of an alloy including at least one of aluminum (Al), copper (Cu), brass, or zinc (Zn).

Here, the bearing accommodating portion of the bracket may have an outer diameter smaller than an outer diameter of the inner housing.

Each of the plurality of bridges of the bracket may include a radial section protruding from an outer surface of the bearing accommodating portion in a radial direction, and an axial section bent from an end portion of the radial section to be disposed in the axial direction.

Here, the axial section of the bracket may be coupled to the inner housing.

In one embodiment disclosed herein, the plurality of bridges may be three in number disposed at equal angular intervals along the circumferential direction.

The stator may include a stator core, a stator coil wound around the stator core, and an insulator part interposed between the stator core and the stator coil for insulation.

In one embodiment disclosed herein, the vortex suppression parts may be disposed on the insulator part.

Each of the vortex suppression parts may be formed as one region of the insulator part extends in the axial direction.

This can prevent an increase in the number of components due to an addition of a separate component for suppressing the vortex generation during the movement of air.

The stator may include a stator core having a plurality of teeth and a stator coil wound around the stator core.

The stator coil may include a plurality of coil portions wound around the plurality of teeth.

The plurality of teeth may be three in number.

The plurality of coil portions may be three in number.

Each of the plurality of coil portions may be configured such that one end of a coil (wire) is connected to a power source.

Each of the plurality of coil portions may be configured such that another end of the coil (wire) is connected to a neutral wire.

Here, one of a pair of connection pins may be connected to the power source and the other may be connected to the neutral wire.

The vortex suppression parts may be disposed outside the plurality of coil portions in a radial direction, respectively.

A lead-in side wire of each of the plurality of coil portions may be connected to the connection pin connected to the power source.

A lead-out side wire of each of the plurality of coil portions may be connected to the connection pin connected to the neutral wire.

In one embodiment disclosed herein, a wire guide may be disposed at least one side of each vortex suppression part in the circumferential direction to guide a wire of the stator coil.

The wire guide may be disposed on each of both sides of the vortex suppression part in the circumferential direction.

One of the wire guides may guide the lead-in side wire of the corresponding coil portion.

The other one of the wire guides may guide the lead-out side wire of the coil portion.

In one embodiment disclosed herein, the vortex suppression part may include a creepage distance increasing section disposed at an outside of the wire guide in the circumferential direction to be spaced apart from the adjacent bridges.

This can increase creepage distances of the lead-in side wire and the lead-out-side wire inside the vortex current suppression part, respectively.

In one embodiment disclosed herein, an outer surface of the vortex suppression part may have an arcuate shape.

A radius of curvature of an outer surface of the vortex suppression part may correspond to an outer diameter of the inner housing.

The radius of curvature of the outer surface of the vortex suppression part may be set within a range of a preset width (upper limit or lower limit), compared to a radius of the inner housing.

That is, the outer surface of the vortex suppression part may be formed to be slightly larger or smaller than an outer surface of the inner housing.

The radius of curvature of the outer surface of the vortex suppression part may preferably be substantially the same as the radius of the inner housing.

The outer surface of the vortex suppression part may be disposed on an extension line of the outer surface of the inner housing along the axial direction.

Accordingly, air that has moved along the outer surface of the inner housing can continuously move along the outer surface of the vortex suppression part without changing a direction.

The motor assembly may further include a PCB provided on one side of the bracket along the axial direction.

The PCB and the stator may be connected by a plurality of connection pins.

The plurality of connection pins may be coupled through the vortex suppression part.

The PCB may be disposed to be spaced apart from the vortex suppression part by a preset distance in the axial direction.

This can facilitate cooling of the inside of the vortex suppression part by a reflux flow at a downstream-side end portion of the vortex suppression part.

An end portion of the vortex suppression part may be disposed on the same plane as an end portion of the bracket in the axial direction.

With this configuration, since the downstream-side end portion of the vortex suppression part, as well as the downstream-side end portion of the bracket, is spaced apart from the PCB, air that has moved along the outer surface of the vortex suppression part can partially move to the inside of the vortex suppression part, so as to cool the inside (inner space) of the vortex suppression part.

In one embodiment disclosed herein, the vortex suppression part may include an extension section protruding more than the bracket to be close to or in contact with the PCB.

This can further suppress a generation of vortex of air that has passed through the vortex suppression part.

With this configuration, an occurrence of flow loss of air that is caused by the vortex generation when the impeller 210 operates can be suppressed.

In one embodiment disclosed herein, the extension section of the vortex suppression part may be configured such that an end portion thereof comes in contact with the PCB.

This can further suppress the vortex generation when the impeller operates.

In one embodiment disclosed herein, the vortex suppression part may include a through portion formed through a planar surface thereof such that inside and outside thereof communicate with each other in a radial direction.

This can facilitate heat dissipation from the inside of the vortex suppression part.

With this configuration, cooling of the stator and the rotor can be further promoted.

In one embodiment disclosed herein, each of the plurality of bridges may include an insertion end portion formed by cutting an end portion of the bridge in a thickness direction so as to be inserted into the inner housing.

This can suppress a generation of a radial clearance of the bracket.

In one embodiment disclosed herein, the stator may include a stator core, a stator coil wound around the stator core, and an insulator part interposed between the stator core and the stator coil to insulate the stator coil, and the insulator part may include bridge insertion portions into which end portions of the bridges are inserted, respectively.

This can suppress a generation of a circumferential clearance of the bracket.

In one embodiment disclosed herein, a circumferential protrusion may protrude in the circumferential direction from any one of contact surfaces between the bridge insertion portion and the bridge, and a circumferential protrusion accommodating portion for accommodating the circumferential protrusion may be disposed on another one of the contact surfaces between the bridge insertion portion and the bridge.

This can facilitate coupling of the bracket, the insulator part, and the inner housing.

In one embodiment disclosed herein, the motor assembly may further include a printed circuit board (PCB) having a plurality of connection pins protruding in the axial direction, the PCB disposed on one side of the bracket.

The vortex suppression part may be formed of an electrical insulating member, and have one side to which the plurality of connection pins are coupled and another side coupled to the stator.

This can suppress an increase in a size of a mold of the insulator part which is caused due to the formation of the vortex suppression part.

In one embodiment disclosed herein, the stator may include a stator core, a stator coil wound around the stator core, and an insulator part for insulating the stator coil.

The vortex suppression part may be in surface-contact with the insulator part in the axial direction.

In one embodiment disclosed herein, an axial protrusion may protrude in the axial direction from any one of contact surfaces between the insulator part and the vortex suppression part, and an axial protrusion accommodating portion for accommodating the axial protrusion may be disposed on another one of the contact surfaces between the insulator part and the vortex suppression part.

This can suppress the generation of axial and radial clearances of the insulator part and the vortex suppression part.

According to another aspect of the present disclosure, a hair dryer according to one embodiment may include a hair dryer body having an air outlet, a handle having an air inlet and connected to communicate with the hair dryer body, and the motor assembly disposed inside the handle.

Here, an electric heater for heating air may be disposed in at least one of the hair dryer body and the handle.

The electric heater may be disposed inside the hair dryer body.

Advantageous Effects of Invention

As described above, according to one embodiment of the present disclosure, a motor assembly may include a bearing disposed on one side of a rotor in an axial direction, a bracket having a bearing accommodating portion for accommodating the bearing, and a plurality of bridges disposed on a circumference of the bearing accommodating portion at spacings in a circumferential direction, and vortex suppression parts to block empty spaces between the plurality of bridges, thereby suppressing a generation of vortex due to the bracket when air moved by the impeller passes through the bracket.

In addition, a stator may include a stator core and an insulator part for insulating a stator coil, and the vortex suppression parts may be integrally formed with the insulator part, thereby preventing an addition of a separate component for suppressing vortices.

Since an outer surface of the vortex suppression part has an arcuate shape, this can effectively suppress a generation of vortex due to the bracket when air moved by an impeller passes through the bracket.

A radius of curvature of the outer surface of the vortex suppression part can correspond to a radius of an inner housing, the vortex generation can be more effectively suppressed.

As the vortex suppression part is spaced apart from a PCB in the axial direction, a reflux flow can be produced at a downstream-side end portion of the vortex suppression part in the axial direction, thereby facilitating cooling of an inner space of the vortex suppression part.

The vortex suppression part may include an extension section extending to be in contact with the PCB, which can more effectively suppress an occurrence of flow loss due to the vortex generation.

The vortex suppression part may include a through portion formed through a planar surface thereof such that inside and outside thereof can communicate with each other, thereby facilitate heat exchange between the inside and the outside of the vortex suppression part.

The vortex suppression part may include a wire guide for guiding a wire of the stator coil, thereby preventing a contact between the wire and the bridge. The vortex suppression part may include a creepage distance increasing section disposed on an outside of the wire guide to be spaced apart from adjacent bridges of the bracket, thereby improving an insulation performance of a conductor (wire) inside the vortex suppression part.

A circumferential protrusion and a circumferential protrusion accommodating portion may be disposed between the insulator part and the plurality of bridges, which can suppress a generation of a radial clearance between the insulator part and the bracket.

The vortex suppression part may be coupled to connection pins of the PCB, which may allow the PCB to be coupled to the insulator part. This can suppress an increase in a size of a mold of the insulator part which is caused due to the formation of the vortex suppression part.

In addition, the vortex suppression part and the insulator part may be provided with an axial protrusion protruding in the axial direction and an axial protrusion accommodating portion, thereby increasing a coupling force of the vortex suppression part and the insulator part.

MODE FOR THE INVENTION

Figure 1:
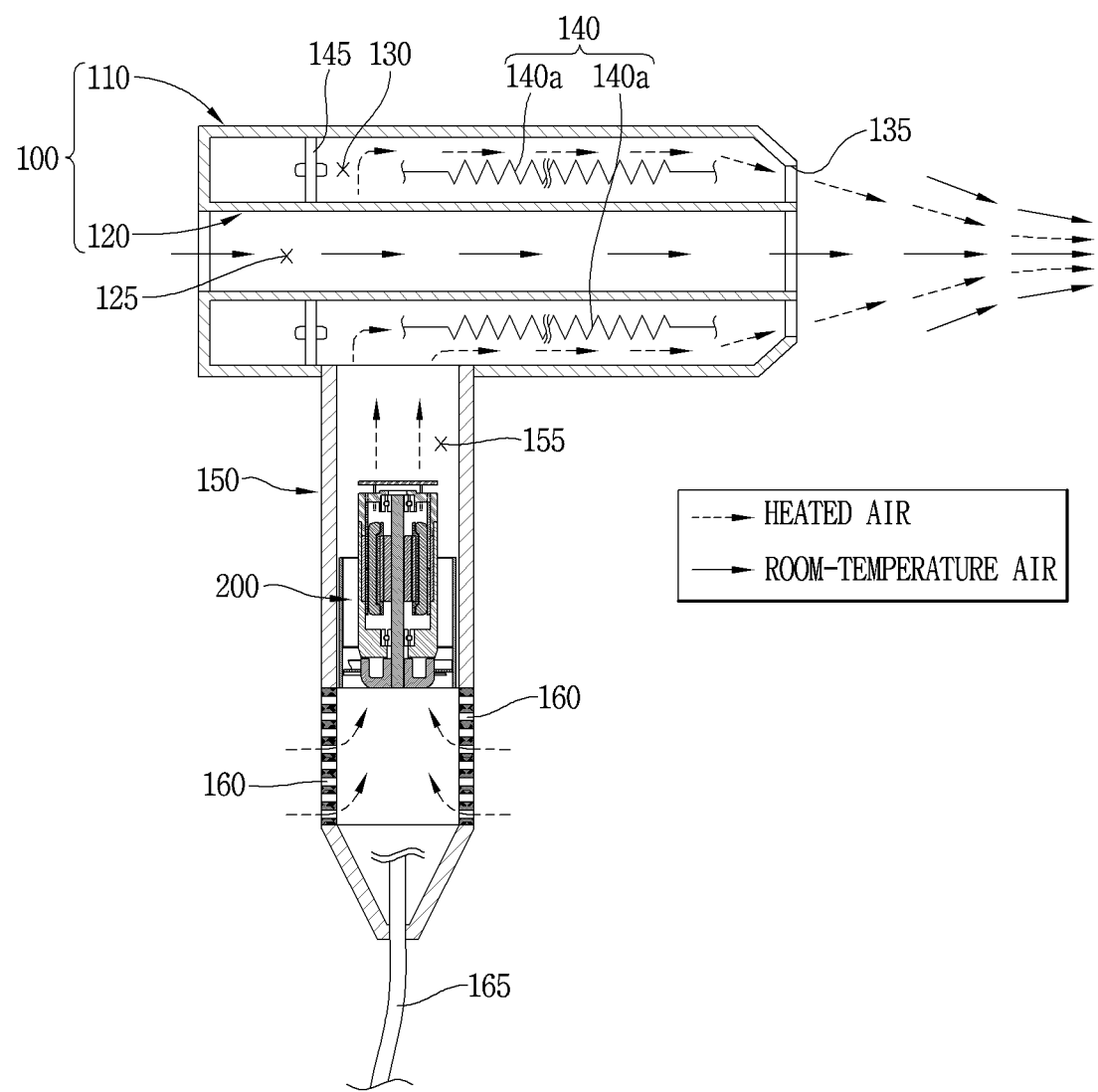
FIG. 1 is a sectional view illustrating a hair dryer having a motor assembly in accordance with one embodiment of the present disclosure.

Hereinafter, implementations of the present disclosure will be described in detail with reference to the accompanying drawings. For the sake of brief description with reference to the drawings, the same or equivalent components will be provided with the same reference numerals, and description thereof will not be repeated. A singular representation used herein may include a plural representation unless it represents a definitely different meaning from the context. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

FIG. 1 is a sectional view of a hair dryer having a motor assembly in accordance with one embodiment of the present disclosure. As illustrated in FIG. 1, a hair dryer having a motor assembly according to an embodiment of the present disclosure includes a hair dryer body 100, a handle 150 provided on the hair dryer body 100, and a motor assembly 200 disposed inside the handle 150.

The hair dryer body 100 defines therein an airflow path 130 through which air flows.

An air outlet 135 through which air is discharged is disposed in one side of the hair dryer body 100.

The hair dryer body 100 includes an outer case 110, and an inner case 120 disposed inside the outer case 110.

Each of the outer case 110 and the inner case 120 is implemented, for example, in a cylindrical shape.

The inner case 120 has a reduced size compared to the outer case 110.

An outer surface of the inner case 120 is spaced apart from an inner surface of the outer case 110, and the air flow path 130 through which air can move is defined between the outer surface of the inner case 120 and the outer case 110.

A space 125 is defined inside the inner case 120.

The space 125 of the inner case 120 has both sides open along an axial direction.

Accordingly, air can flow from one side to another side of the space 125 inside the space 125.

An electric heater 140 for heating air is disposed in the air flow path 130.

The electric heater 140 includes a heat generating member 140a that can generate heat by electric resistance heat when power is supplied. The heat generating member 140a may be made of, for example, a nichrome wire.

A main printed circuit board (PCB) 145 connected to the electric heater 140 may be disposed inside the hair dryer body 100. The main PCB 145 may be configured to include, for example, a program for controlling operations of the electric heater 140 and the motor assembly 200.

Although not specifically illustrated, the hair dryer body 100 and/or the handle 150 may be provided with a signal input unit (button) for inputting a control signal (operation signal), and the signal input unit for inputting the control signal may be connected to the main PCB 145 such that such a signal can be transferred.

Accordingly, the main PCB 145 may control the motor assembly 200 and the electric heater 140, respectively, based on a control signal input through the signal input unit.

The handle 150 is disposed on one side of the hair dryer body 100.

The handle 150 has an accommodation space 155 formed therein.

The handle 150 is configured to allow air to flow along its inside.

One end (an upper end in the drawing) of the handle 150 is connected to the hair dryer body 100.

The handle 150 is connected to communicate with the hair dryer body 100.

Accordingly, air that has passed through the inside of the handle 150 can flow into the hair dryer body 100.

An air inlet 160 through which external air is suctioned into the handle 150 is disposed in the handle 150.

The air inlet 160 may be located in a lower end portion of the handle 150, for example.

The motor assembly 200 may be disposed at a downstream side of the air inlet 160.

Accordingly, air suctioned through the air inlet 160 can move downstream via the motor assembly 200.

The motor assembly 200 is disposed inside the handle 150.

The handle 150 is provided with a cable 165 connected to an external power source (commercial power source).

The cable 165 may be connected to the motor assembly 200 and the main PCB 145.

Accordingly, power can be supplied to the motor assembly 200, the main PCB 145, and the electric heater 140, respectively.

The motor assembly 200 includes an impeller 210 and an impeller operating part 278 for operating the impeller 210. The impeller operating part 278 includes, for example, a stator 280 and a rotor 340 connected to the impeller 210 and rotatably disposed with a preset gap G with respect to the stator 280.

With this configuration, when the impeller 210 rotates as the motor assembly 200 is driven, external air is suctioned into the handle 150 through the air inlet 160. The air that has passed through the handle 150 is introduced into the hair dryer body 100.

While flowing along the air flow path 130 inside the hair dryer body 100 can be heated during the operation of the electric heater 140 and discharged to the outside through the air outlet 135. When the heated air or air at room temperature (when the electric heater 140 is not in operation) is discharged through the air outlet 135, the air may join air around the air outlet 135.

When the air is discharged through the air outlet 135, internal air of the inner case 120 and air around the air outlet 135 of the outer case 110 can flow by being combined with the air discharged through the air outlet 135.

Figure 2:
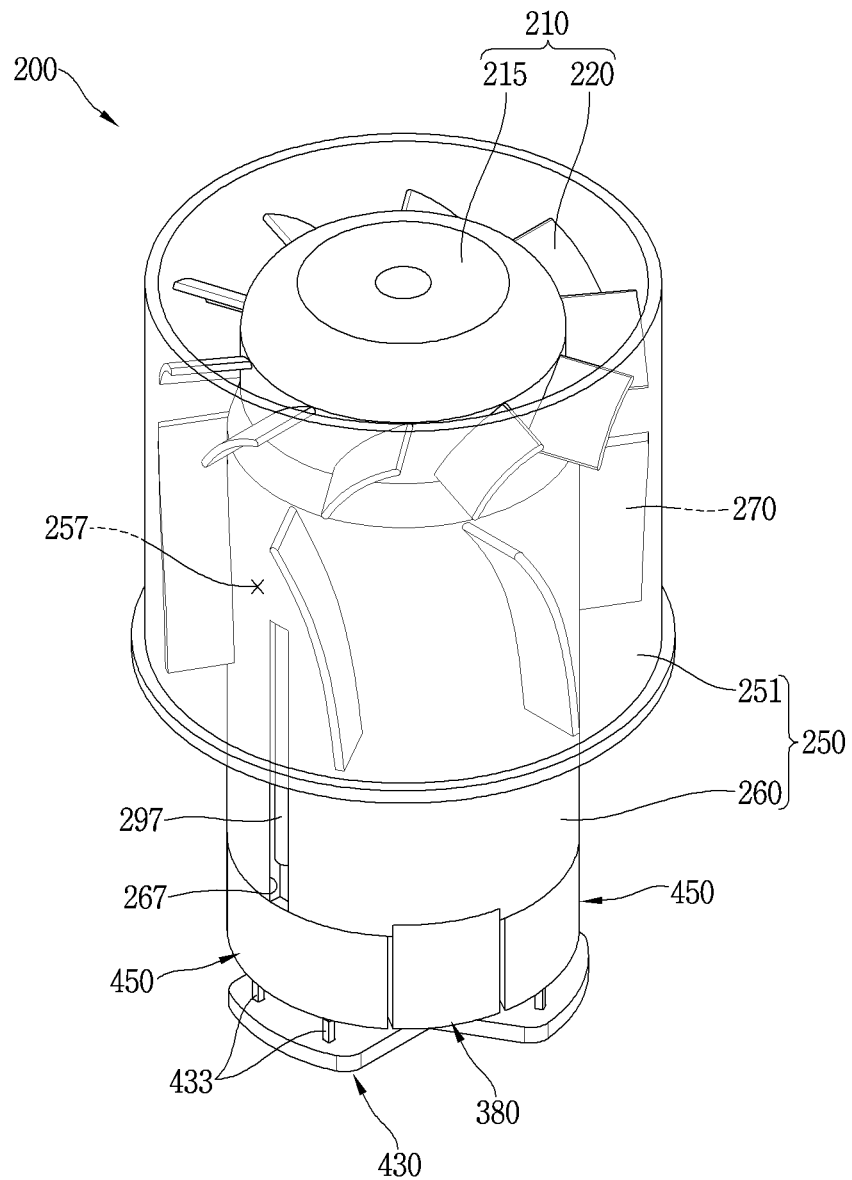
FIG. 2 is a perspective view illustrating the motor assembly of FIG. 1.
Figure 3:
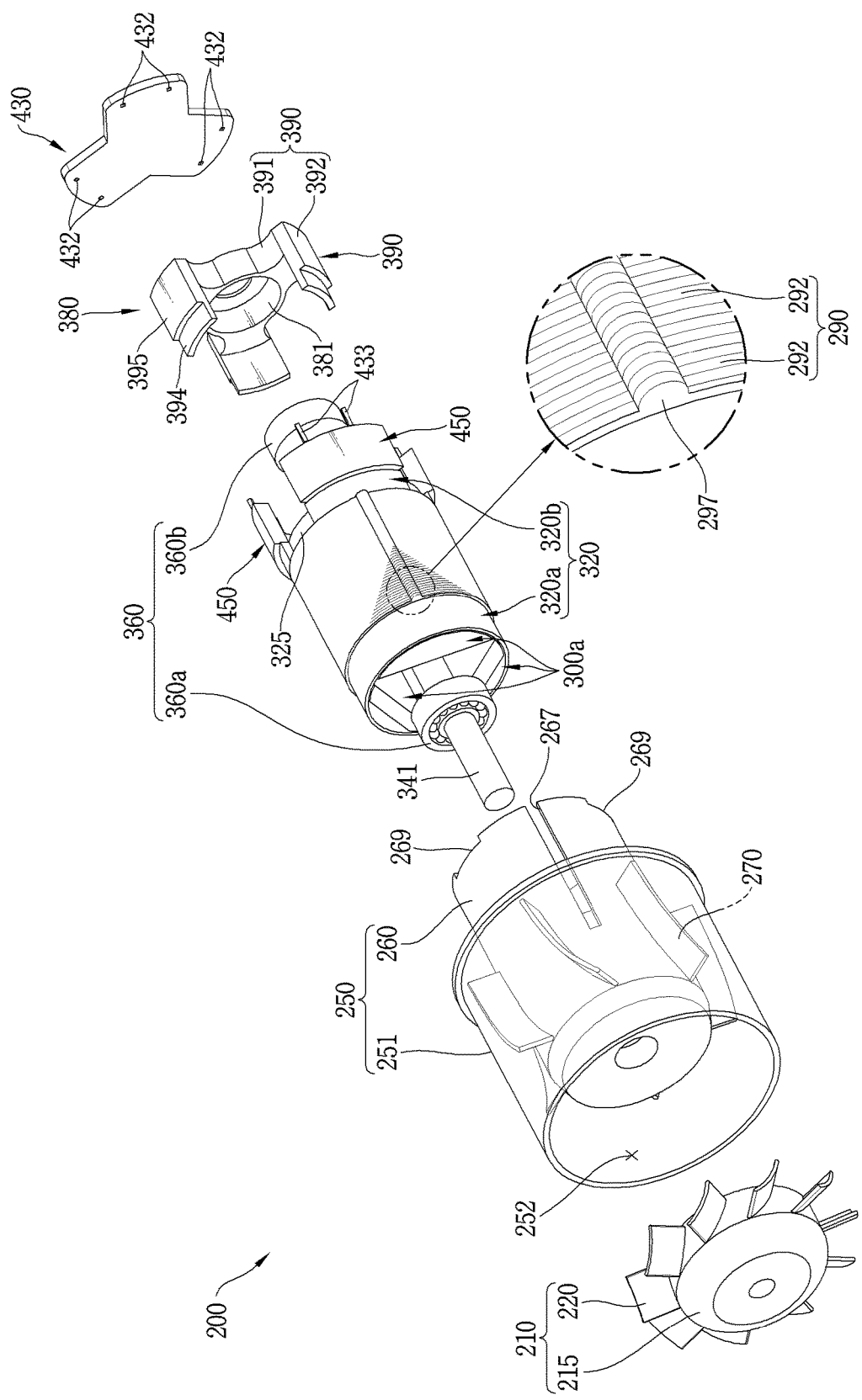
FIG. 3 is an exploded perspective view illustrating the motor assembly of FIG. 1.
Figure 4:
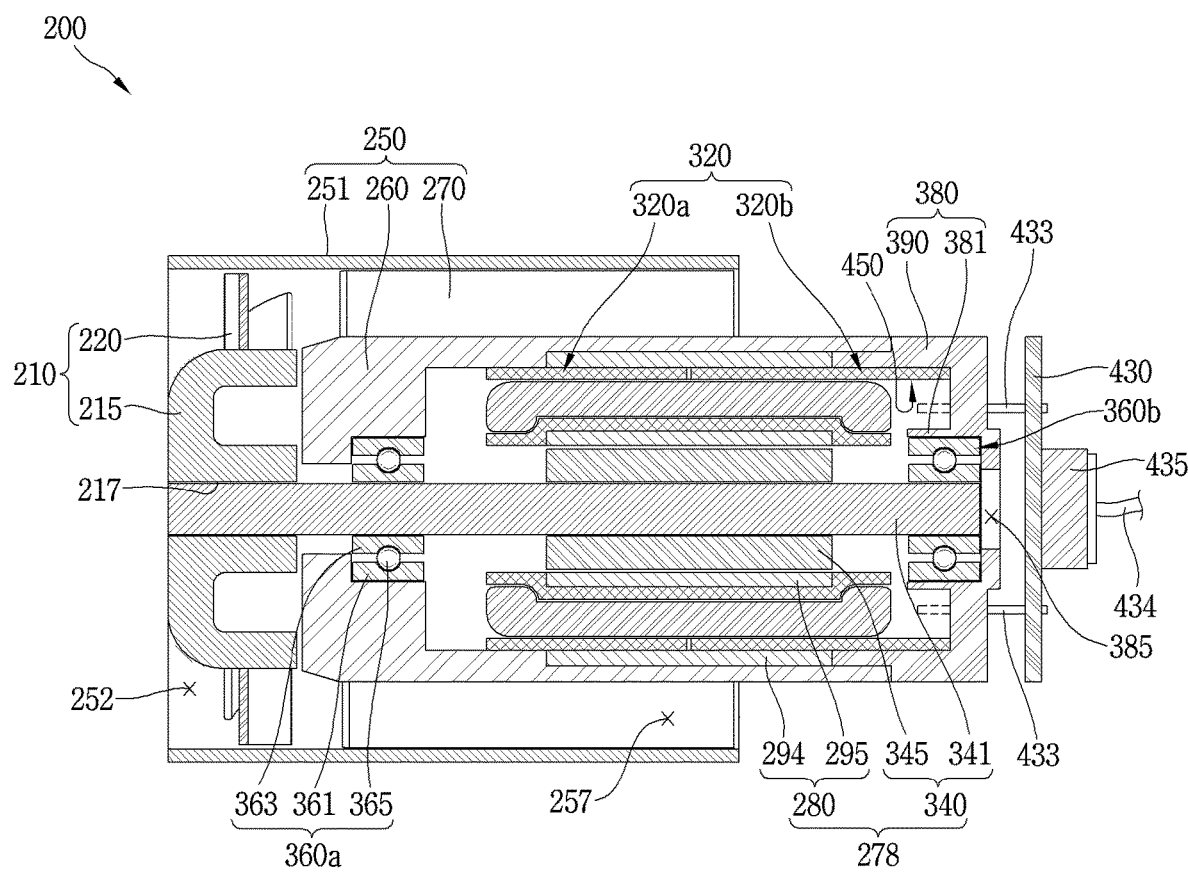
FIG. 4 is an enlarged sectional view illustrating the motor assembly of FIG.

FIG. 2 is a perspective view illustrating the motor assembly of FIG. 1, FIG. 3 is an exploded perspective view illustrating the motor assembly of FIG. 1, and FIG. 4 is an enlarged sectional view illustrating the motor assembly of FIG. 1. As illustrated in FIGS. 2 to 4, the motor assembly 200 includes an impeller 210, a housing 250, an impeller operating part 278, a first bearing 360a, a second bearing 360b, a bracket 380, and a vortex suppression part 450.

The impeller 210 includes the hub 215 and the plurality of blades 220 disposed along a circumference of the hub 215.

The hub 215 has a cylindrical shape. A rotating shaft hole 217 in which a rotating shaft 341 of the rotor 340 to be explained later can be inserted is formed in the hub 215. The plurality of blades 220 protrude from the circumference of the hub 215 in a radial direction and are arranged to be spaced apart from one another in a circumferential direction.

The impeller 210 is, for example, configured to rotate counterclockwise in the drawing.

The impeller 210 is configured to promote a movement of air in the axial direction during rotation.

The housing 250 includes an outer housing 251 and an inner housing 260 that are arranged concentrically with each other.

The housing 250 may be made of a metal member.

The outer housing 251 has a cylindrical shape, and the impeller 210 is rotatably accommodated in one side of the outer housing 251.

An impeller accommodation space 252 is defined in one side (left side of FIG. 4) of the outer housing 251.

The inner housing 260 is disposed on one side of the impeller 210 inside the outer housing 251.

In FIG. 4, based on a flowing direction of air that is moved by the impeller 210, a left side of the drawing where the impeller 210 is disposed may be an upstream side, and a right side of the drawing where the main PCB is disposed may be a downstream side.

The inner housing 260 is disposed at the downstream side of the impeller accommodation space 252 along the flowing direction of the air moved when the impeller 210 rotates.

The inner housing 260 has an outer diameter that is reduced smaller than an inner diameter of the outer housing 251.

The inner housing 260 may be configured such that, for example, one end (a left end in the drawing) is blocked and another end (a right end in the drawing) is open.

The inner housing 260 is configured to protrude to the outside of the outer housing 251.

An air movement passage 257 is defined between the inner housing 260 and the outer housing 251.

A plurality of guide vanes 270 for guiding a movement of air are disposed in the air movement passage.

The guide vanes 270 may be located inside the outer housing 251, for example.

The impeller operating part 278 includes, for example, a stator 280 and a rotor 340 disposed to be rotatable relative to the stator 280.

The stator 280 may include, for example, a stator core 290 and a stator coil 300 wound around the stator core 290.

The stator core 290 may be configured by stacking a plurality of electrical steel sheets 292 in an insulating manner.

Each of the plurality of electrical steel plates 292 of the stator core 290 may include a yoke 294 in a circular shape, and a plurality of teeth 295 protruding radially from an inner surface of the yoke 294. The plurality of teeth 295 may be, for example, three in number.

The stator coil 300 may be configured as, for example, a so-called concentrated winding that is intensively wound around the teeth 295. The stator coil 300 may include three coil portions 300a wound on the three teeth 295, respectively.

Here, each of the three coil portions 300a includes a lead-in side wire 301a drawn in to be wound on a periphery of the tooth 295, and a lead-out side wire 301b wound on the periphery of the tooth by a preset number of turns and then drawn out again.

The stator coil 300 may be configured such that the three coil portions 300a are connected to respective AC phases (U-phase, V-phase, and W-phase) of a three-phase AC power source that is a power supply source.

The lead-in side wire 301a of each coil portion 300a is connected to each phase (U-phase, V-phase, W-phase) of the power source, and the lead-out side wire 301b of the coil portion 300a is connected to a neutral wire.

The stator 280 may be implemented to be rotatable at a high speed, for example, 150 to 185 KRPM.

The stator 280 includes an insulator part 320 for insulating the stator coil 300.

The insulator part 320 may be disposed between the stator core 290 and the stator coil 300, for example.

The rotor 340 may include, for example, a rotating shaft 341 and a permanent magnet 345 rotating centering on the rotating shaft 341.

The rotating shaft 341 may protrude, for example, to both sides of the permanent magnet 345.

Bearings 360 that rotatably support the rotating shaft 341 are disposed on both sides of the rotor 340, respectively.

The bearings 360 may include a first bearing 360a and a second bearing 360b, for example.

The first bearing 360a may be disposed, for example, at an upstream side of the permanent magnet 345 along a flowing direction of air.

The second bearing 360b may be disposed, for example, at a downstream side of the permanent magnet 345 along the flowing direction of the air.

A first bearing coupling portion 265 is disposed on the inner housing 260 so that the first bearing 360a can be received and coupled.

The first bearing 360a and the second bearing 360b may be implemented as ball bearings.

Each of the bearings 360 (the first bearing 360a and the second bearing 360b) may include an outer ring 361, an inner ring 363 concentrically disposed at an inner side of the outer ring 361, and a plurality of balls 365 disposed between the outer ring 361 and the inner ring 363.

The bearings 360, for example, are configured to have an outer diameter smaller than an outer diameter of the inner housing 260.

The bearings 360, for example, are configured to have an outer diameter smaller than an outer diameter of the stator 280.

The rotating shaft 360 may have an outer diameter that is, for example, slightly larger than an outer diameter of the permanent magnet 345.

The stator 280 may be inserted into the inner housing 260.

A coupling protrusion 297 may protrude radially outward from the outer surface of the stator core 290. The coupling protrusion 297 may extend in the axial direction. The coupling protrusion 297 may be provided in plurality spaced apart from one another in the circumferential direction of the stator 280. The coupling protrusion 297 may be provided by one in number, for example. This embodiment illustrates an example in which the single coupling protrusion 297 is provided. However, this is merely illustrative and the coupling protrusion 297 may alternatively be provided in plurality.

A slot 267 may be formed in the inner housing 260 such that the coupling protrusion 297 of the stator 280 can be inserted.

The stator 280 can thusly be assembled at a predetermined position inside the inner housing 260.

The slot 267 may be cut (cut off) to extend along the axial direction. The slot 267 may be provided by one in number, like the coupling protrusion 297, for example.

The second bearing 360b is disposed at the downstream side of the stator 280 and the rotor 340.

The second bearing 360b may be supported by the bracket 380.

The bracket 380 may include, for example, a bearing accommodating portion 381 in which the second bearing 360b is accommodated and a plurality of bridges 390 extending in the axial direction from the bearing accommodating portion 381.

Accordingly, a reflux) is generated that air moving in the axial direction along the outer surface of the inner housing 260 moves inward (toward a center) in the radial direction, which may cause an occurrence of flow loss.

The bracket 380 may be made of a metal member.

Here, the inner housing 260 and the bracket 380 may be made of, for example, aluminum (Al), copper (Cu), brass, or zinc (Zn).

The inner housing 260 and the bracket 380 may be made of an alloy including at least one of aluminum (Al), copper (Cu), brass, or zinc (Zn).

The bearing accommodating portion 381, for example, may be configured such that its outer diameter is smaller than the outer diameter of the inner housing 260.

The bearing accommodating portion 381 may be configured such that its end portion at an upstream side is open and an end portion at a downstream side is blocked.

Therefore, the second bearing 360b can be coupled at the upstream side.

A through hole 385 may be formed through a planar surface of the downstream-side end portion of the bearing accommodating portion 381.

The through hole 385 may be configured, for example, to be smaller than an outer diameter of the inner ring 363 of the bearing 360.

The plurality of bridges 390 may be, for example, three in number.

The plurality of bridges 390 may be configured to be spaced apart from one another at equal angular intervals (e.g., 120-degree intervals in this embodiment) along the circumferential direction. This embodiment illustrates an example in which the plurality of bridges 390 are three in number. However, this is merely illustrative and the number may alternatively be two or more than four.

The plurality of bridges 390 may include, for example, a radial section 391 radially protruding from an outer surface of the bearing accommodating portion 381, and an axial section 392 bent from the radial section 391 and extending in the axial direction.

Here, a maximum outer diameter of the bracket 380 (bridge 390) may be the same as the outer diameter of the inner housing 260, for example.

Each of the plurality of bridges 390 may be configured so that, for example, an end portion is in contact with an end portion of the stator 280.

Each of the plurality of bridges 390 may include an insertion end portion 394 that is to be inserted into the inner housing 260.

The insertion end portion 394 may be cut in a thickness direction such that its outer diameter can be reduced.

The insertion end portion 394 may have a preset length along the axial direction.

Here, each of the bridges 390 may include the insertion end portion 394 and a protruding end portion 395 protruding radially from the insertion end portion 394.

The insulator part 320 may include a bridge insertion portion 325 in which the bridge 390 (insertion end portion 394) is to be inserted.

The bridge insertion portion 325 is provided to correspond to the number of bridges 390 of the bracket 380.

In this embodiment, the bridge insertion portion 325 is provided by three in number.

Each of the bridge insertion portions 325 may have an outer surface (outer diameter surface) corresponding to an inner surface (inner diameter surface) of the bridge 390.

The bridge insertion portion 325 may be reduced in the radial direction and extend in the axial direction.

The bridge insertion portion 325 has a shape in which a downstream-side end portion is open in the axial direction.

Accordingly, the bridge 390 can be inserted into the downstream-side end portion of the bridge insertion portion 325 in the axial direction.

The insertion end portion 394 of each bridge 390 may be configured to be brought into contact with three surfaces of the bridge insertion portion 325 including both side surfaces and an inner surface.

The inner housing 260 may include bridge coupling portions 269 each formed such that one region of the bridge 390 (protruding end portion 395) of the bracket 380 can be inserted therein.

One region of the protruding end portion 395 of the bridge 390 is inserted into the bridge coupling portion 269 by a preset depth.

Each of the bridge coupling portions 269 may be formed by cutting a downstream-side end portion of the inner housing 260 by a preset length in the axial direction.

The bridge coupling portion 269 of the inner housing 260 has a width corresponding to a width of the bridge 390 of the bracket 380.

The insertion end portion 394 of each bridge 390 of the bracket 380 is inserted into the inner housing 260, and the end portion protruding from the insertion end portion 394 of the bridge 390 in the radial direction is inserted into the bridge coupling portion 269 of the inner housing 260.

This can improve coupling force among the stator 280, the inner housing 260, and the bracket 380.

Accordingly, an occurrence of displacement of the second bearing 360b can be suppressed, and shortening of a lifespan of the second bearing 360b due to an occurrence of lateral displacement can be suppressed.

In addition, a uniform air gap between the rotor 340 and the stator 280 can be maintained, and a high-speed operation of the rotor 340 can be allowed.

Meanwhile, a printed circuit board (PCB) 430 may be disposed at one side (right side in FIG. 4) of the bracket 380.

The PCB 430 may be electrically connected to the stator coil 300, for example.

The PCB 430 may store, for example, a control program for controlling currents having different frequencies to be applied.

This can allow the number of rotations (rotational speed) of the rotor 340 (impeller 210) to be changed (adjusted).

The PCB 430 may be provided with a plurality of connection pins 433 protruding along the axial direction.

The PCB 430 may include, for example, a plurality of connection pin holes 432 formed through a planar surface thereof such that the plurality of connection pins 433 are to be inserted.

Each of the plurality of connection pins 433 is formed of an electric conductor.

The PCB 430 has an electric circuit that is electrically connected to the connection pins 433.

The PCB 430 may have, for example, a shape like an alphabet "Y" that is branched in three ways. This embodiment illustrates an example that the PCB 430 has the "Y" shape. However, this is merely illustrative and the PCB 430 may have a circular shape or other shapes.

The plurality of connection pins 433 may be, for example, six in number.

The plurality of connection pins 433 may be provided by three pairs, for example.

The three pairs of connection pins 433 may be spaced apart from one another in the circumferential direction and each pair may be disposed between adjacent bridges 390 of the plurality of bridges 390.

With this configuration, when the impeller 210 rotates, air at the upstream side of the impeller 210 moves to the downstream side of the impeller 210. The air moved to the downstream side of the impeller 210 is guided to the downstream side of the inner housing 260 by the guide vanes 270.

The air guided to the downstream side of the inner housing 260 may move toward the downstream side of the bracket 380 via the bracket 380. At this time, some of the air passing through the bracket 380 generate vortex that the air moves radially inward and rotates (in a space) between the plurality of bridges 390 of the bracket 380, which causes a generation of noise as well as flow loss.

The motor assembly 200 according to the one embodiment of the present disclosure may include a vortex suppression part 450 that blocks adjacent bridges 390 of the plurality of bridges 390 of the bracket 380, thereby suppressing a generation of vortex due to the bracket 380 during a movement of air caused by the impeller 210. This can suppress an occurrence of flow loss due to the vortex generation in the bracket 380, and a generation of noise due to the vortex generation.

In one embodiment of the present disclosure, the vortex suppression part 450 may be disposed in the stator 280, for example.

The vortex suppression part 450 may be formed on the insulator part 320, for example.

More specifically, the vortex suppression part 450 may be formed on a downstream-side end portion of the insulator part 320.

In this embodiment, since the insulator part 320 includes a first insulator part 320a disposed at an upstream side of the stator 280 and a second insulator part 320b disposed at a downstream side of the stator 280, the vortex suppression part may be disposed on a downstream-side end portion of the second insulator 320b.

This embodiment illustrates an example in which the insulator part is configured with two insulators. However, this is merely illustrative, and the insulator part may alternatively be configured as a single insulator (integral form). In this case, the vortex suppression part 450 may be disposed on the downstream-side end portion of the single insulator.

The vortex suppression part 450 may be configured such that one region of the insulator part 320 protrudes in the axial direction to be disposed between the plurality of bridges 390 of the bracket 380.

In this embodiment, the vortex suppression part 450 may be integrally formed with the second insulator 320b.

This can prevent an increase in the number of assembling operations due to the addition of separate components for forming the vortex suppression part 450 that blocks the adjacent bridges 390 of the bracket 380.

An outer surface of the vortex suppression part 450 may have a circular arcuate cross section.

The coil portion 300a of the stator coil 300 may be disposed inside the vortex suppression part 450.

The vortex suppression part 450 may be provided by three in number to correspond to the three bridges 390.

The vortex suppression parts 450 may be formed by axially extending the insulator part 320 that is disposed outside the respective coil portions 300a of the stator coil 300.

Bridge accommodation spaces in which the respective bridges 390 of the bracket 380 are accommodated may be formed between the adjacent vortex suppression parts 450.

Each of the vortex suppression parts 450 may have a circumferential length (arcuate length) corresponding to a distance between the adjacent bridges 390.

Each of the vortex suppression parts 450 may be configured such that a downstream-side end portion thereof is disposed on the same plane as the downstream-side end portion of the bracket 380.

That is, one end of the vortex suppression part 450 may be connected to the insulator part 320 and another end (the downstream-side end portion) extend in the axial direction to be disposed on the same plane as the downstream-side end portion of the bracket 380.

The connection pins 433 of the PCB 430 may be inserted into the vortex suppression part 450 by a preset depth.

Any one of the pair of connection pins 433 connected to each vortex suppression part 450 may be connected to a lead-in side wire 301a of the coil portion 300a of the stator coil 300.

Another one of the pair of connection pins 433 connected to each vortex suppression part 450 may be connected to a lead-out side wire 301b of the coil portion 300a of the stator coil 300.

Figure 5:
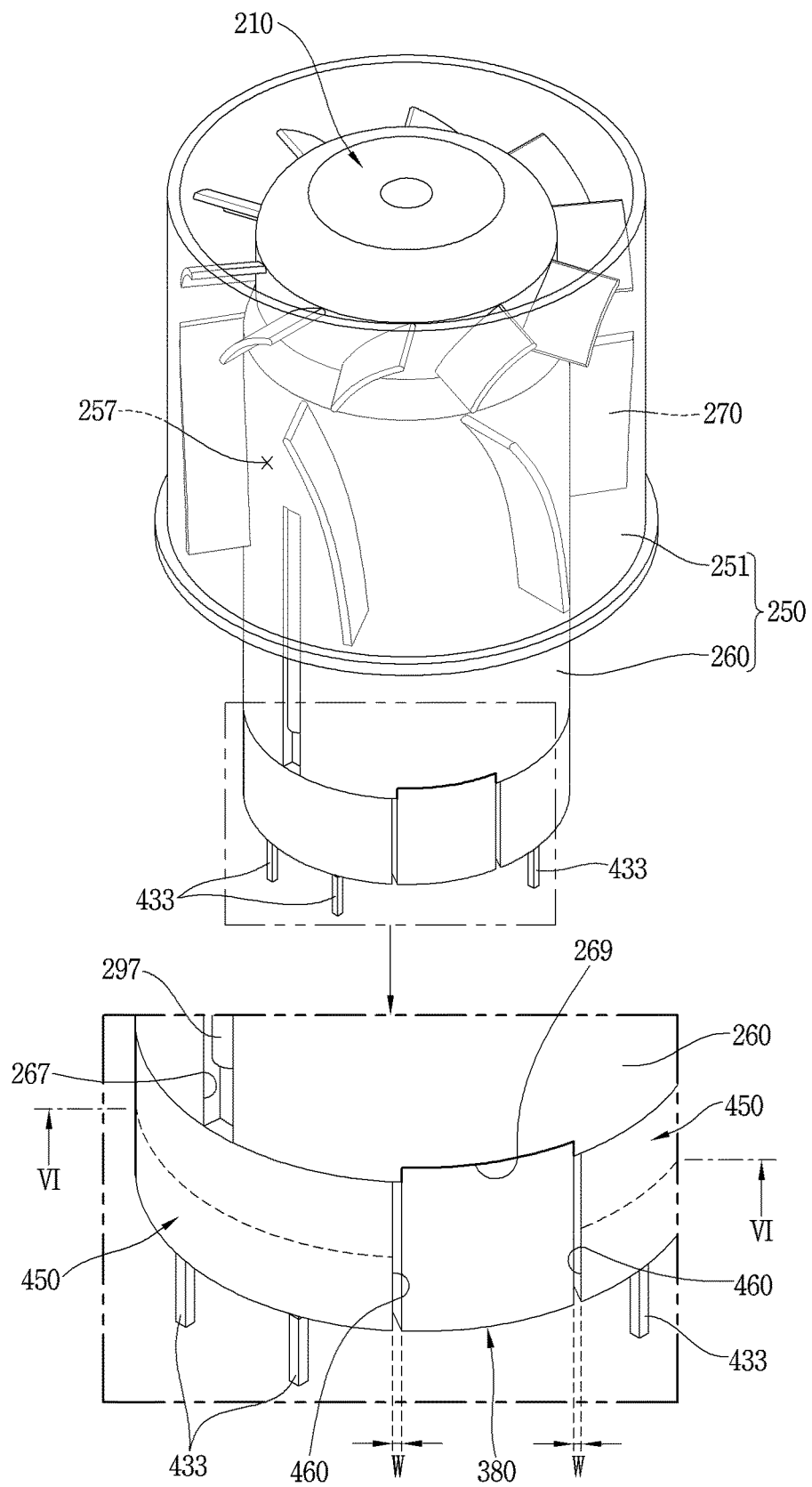
FIG. 5 is a perspective view for explaining a coupling relationship of an inner housing, a bracket, and a vortex suppression part of FIG. 3.
Figure 6:
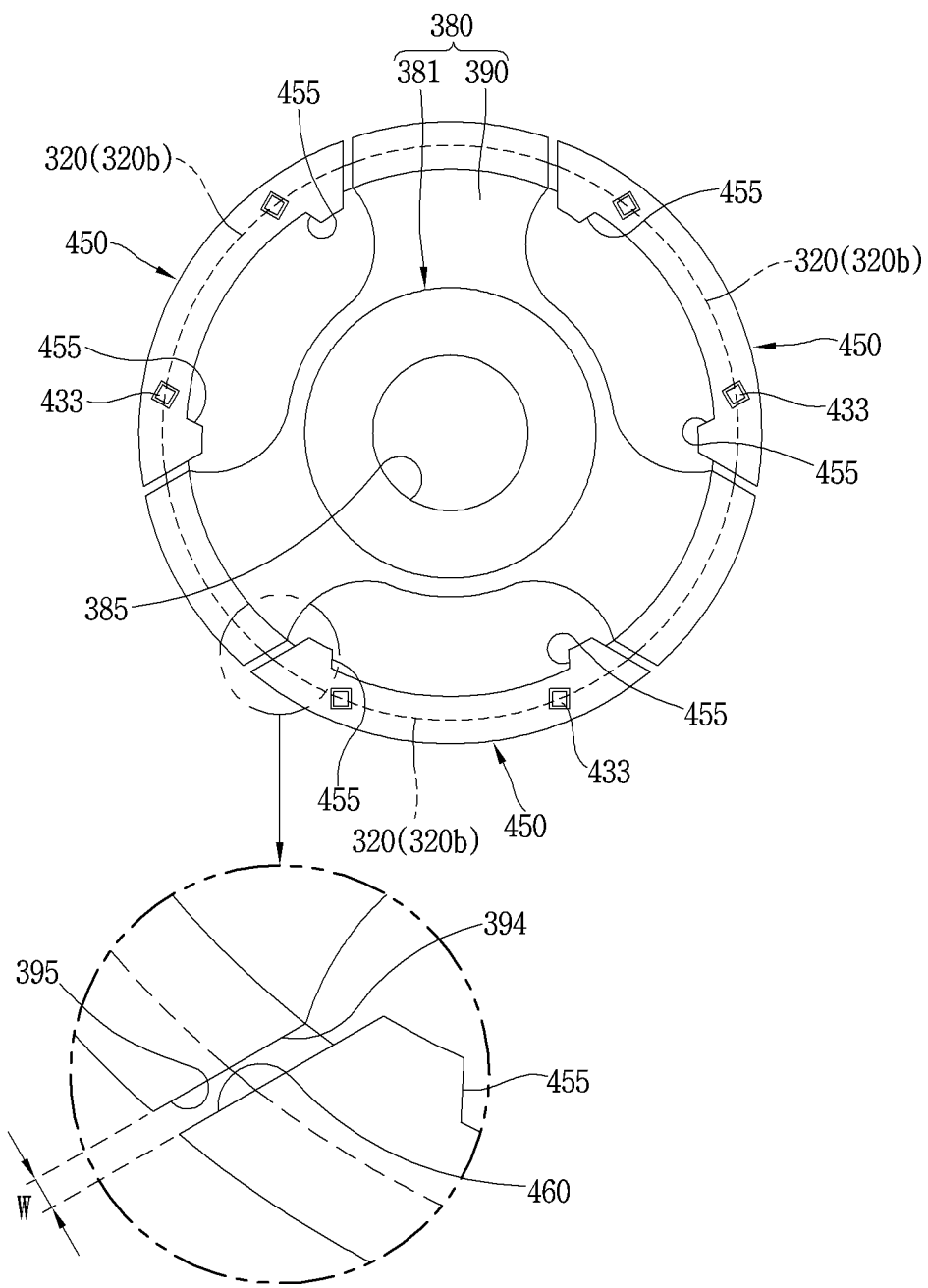
FIG. 6 is a cross-sectional view of the vortex suppression part of FIG. 5.
Figure 7:
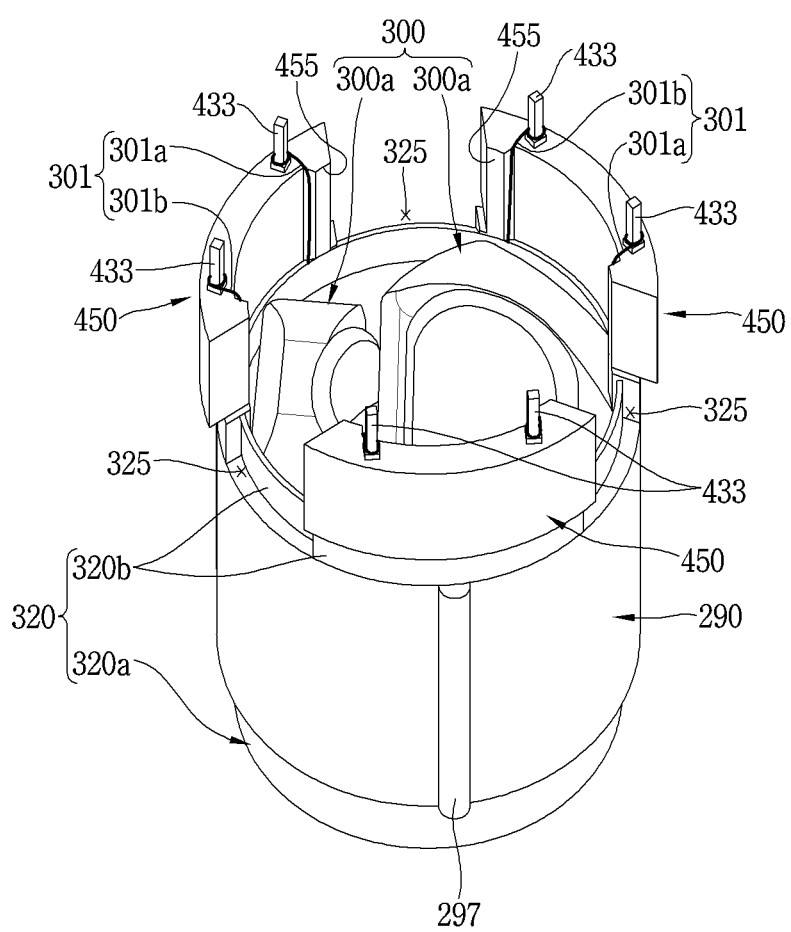
FIG. 7 is a perspective view illustrating an inner surface of the vortex suppression part of FIG. 3.

FIG. 5 is a perspective view for explaining a coupling relationship of the inner housing, the bracket, and the vortex suppression part of FIG. 3, FIG. 6 is a cross-sectional view of FIG. 5, and FIG. 7 is a perspective view illustrating an inside of the vortex suppression part of FIG. 6. As illustrated in FIG. 5, the vortex suppression parts 450 are disposed in a downstream region of the inner housing 260 in a moving direction of air. The bridges 390 of the bracket 380 are respectively coupled between the adjacent vortex suppression parts 450.

In the bracket 380, the insertion end portions 394 of the plurality of bridges 390 are inserted into the inner housing 260, and the protruding end portions 395 of the plurality of bridges 390 are inserted into the bridge coupling portions 269 of the inner housing 260, respectively.

Meanwhile, each of the vortex suppression parts 450 has an arcuate cross-sectional shape, as illustrated in FIG. 6.

The vortex suppression parts 450 are disposed to define a hollow space therein.

An inner surface of each vortex suppression part 450 is spaced apart from an outer surface of the rotating shaft 341 by a preset distance.

The inner surface of the vortex suppression part 450 may be configured to be the same as the inner surface of the insulator part 320 or to more extend than the inner surface of the insulator part 320.

The inner surface of the vortex suppression part 450 may be disposed more outward than the outer surface of the coil portion 300a of the stator coil 300.

The plurality of connection pins 433 are inserted into each of the vortex suppression parts 450.

The vortex suppression part 450 has a larger thickness than the plurality of connection pins 433.

The vortex suppression part 450 has an outer diameter larger than an outer diameter of the insulator part 320.

Here, the outer diameter of the insulator part 320 is disposed inside the inner housing 260, and the outer surface of the vortex suppression part 450 is disposed on an extension line of the outer surface of the inner housing 260. Accordingly, the outer surface of the vortex suppression part 450 is expanded more than the outer surface of the insulator part 320 to correspond to the thickness of the inner housing 260.

The vortex suppression part 450 is disposed so that the outer surface thereof corresponds to the outer diameter of the inner housing 260.

The vortex suppression part 450 is configured to have an outer surface (outer diameter) that is substantially the same as the outer diameter of the inner housing 260.

This can thusly suppress an occurrence of flow loss of air that is moved by the rotation of the impeller 210.

On the other hand, each of the vortex suppression parts 450 includes wire guides 455 that guide the wire 301 extending from the stator coil 300.

The wire guides 455 are respectively formed on both sides of the vortex suppression part 450 along the circumferential direction.

Here, the wire guides 455 are configured to guide the lead-in side wire 301a and the lead-out side wire 301b of each coil portion 300a of the stator coil 300.

The wire guides 455 protrude inward from the inner surface of the vortex suppression part 450 along the radial direction.

The wire guides 455, as illustrated in FIG. 7, protrude radially from the inner surface of the vortex suppression part 450 and extend in the axial direction.

This can suppress the wire 301 disposed inside the wire guide 455 from unexpectedly moving toward the bracket 380 (bridge 390).

The lead-in side wire 301a and the lead-out side wire 301b of each coil portion 300a of the stator coil 300 are electrically connected to the adjacent connection pins 433, respectively, of the plurality of connection pins 433.

The lead-in side wire 301a of each coil portion 300a is electrically wound at least once or several times, for example, on the connection pin 433 that is coupled to one side of the vortex suppression part 450.

The lead-out side wire 301b of each coil portion 300a is electrically wound at least once or several times, for example, on the connection pin 433 that is coupled to another side of the vortex suppression part 450.

Contact regions of the lead-in side wire 301a and the lead-out side wire 301b with the connection pins 433 may be peeled off for electrical connection.

With this configuration, the first bearing 360a is accommodated in the first bearing coupling portion 265 inside the inner housing 260, and the stator 280 is accommodated in the inner housing 260. The stator 280 is inserted in the axial direction in a state in which the coupling protrusion 297 is inserted into the slot 267 of the inner housing 260. The rotor 340 is coupled into the stator 280.

Meanwhile, the second bearing 360b may be coupled to the rotating shaft 341 of the rotor 340 and the bracket 380 may be coupled to accommodate the second bearing 360b therein.

The bracket 380 may be inserted in the axial direction in a state in which each of the plurality of bridges 390 is disposed between the adjacent vortex suppression parts 450.

More specifically, the respective insertion end portions 394 of the bridges 390 of the bracket 380 are inserted into the inner housing 260 and the bridge insertion portions 325 of the insulator part 320.

When each of the bridges 390 is continuously inserted, the protruding end portion 395 of each of the bridges 390 is inserted into the bridge coupling portion 269 of the inner housing 260.

The PCB 430 may be coupled to end portions of the connection pins 433 of the vortex suppression part 450. The end portions of the connection pins 433 may be inserted into the corresponding connection pin holes 432 of the PCB 430, respectively.

Meanwhile, when an operation is started, power of a frequency preset by the PCB 430 may be supplied to the stator coil 300. As a result, a rotating magnetic field is produced in the stator coil 300 so as to interact with a magnetic field produced by the permanent magnet 345, so that the rotor 340 can be rotated centering on the rotating shaft 341. When the rotor 340 is rotated, the impeller 210 may be rotated, and air may be moved by the impeller 210 from the upstream side of the external housing 251 toward the downstream side of the impeller 210 via the impeller 210.

The air moved to the downstream side by the impeller 210 is guided by the guide vanes 270, and then moves to the downstream side of the inner housing 260 along the outer surface of the inner housing 260.

At this time, since the outer surfaces of the vortex suppression parts 450 and the plurality of bridges 390 of the bracket 380 are the same as the outer diameter of the inner housing 260, the air moved along the inner housing 260 can continuously move in a linear shape along the outer surfaces of the vortex suppression parts 450 and the bridges 390 without a radially inward movement (vortex).

This can suppress the vortex from being generated when the air moved downstream by the impeller 210 passes through the bracket 380.

With this configuration, an occurrence of flow loss of air by the impeller 210 can be suppressed. In addition, noise generation due to the generation of the vortex can be suppressed.

On the other hand, the rotor 340 can be supported by the first bearing 360a and the second bearing 360b disposed on both sides of the rotor 340 along the axial direction, so that an occurrence of lateral displacement can be suppressed during the rotation of the rotor 340.

In addition, in the bracket 380, the insertion end portions 394 of the plurality of bridges 390 can be supported by the insulator part 320 and the inner housing 260, and the protruding end portions 395 of the bridges 390 can be supportedly coupled into the bridge coupling portions 269 of the inner housing 260, so that the bearing accommodating portions 381 of the bracket 380 can be suppressed from being laterally displaced.

Accordingly, the occurrence of lateral displacement of the rotating shaft 341 and the rotor 340 can be suppressed, and the air gap G between the rotor 340 and the stator 280 can be uniformly and stably maintained.

Figure 8:
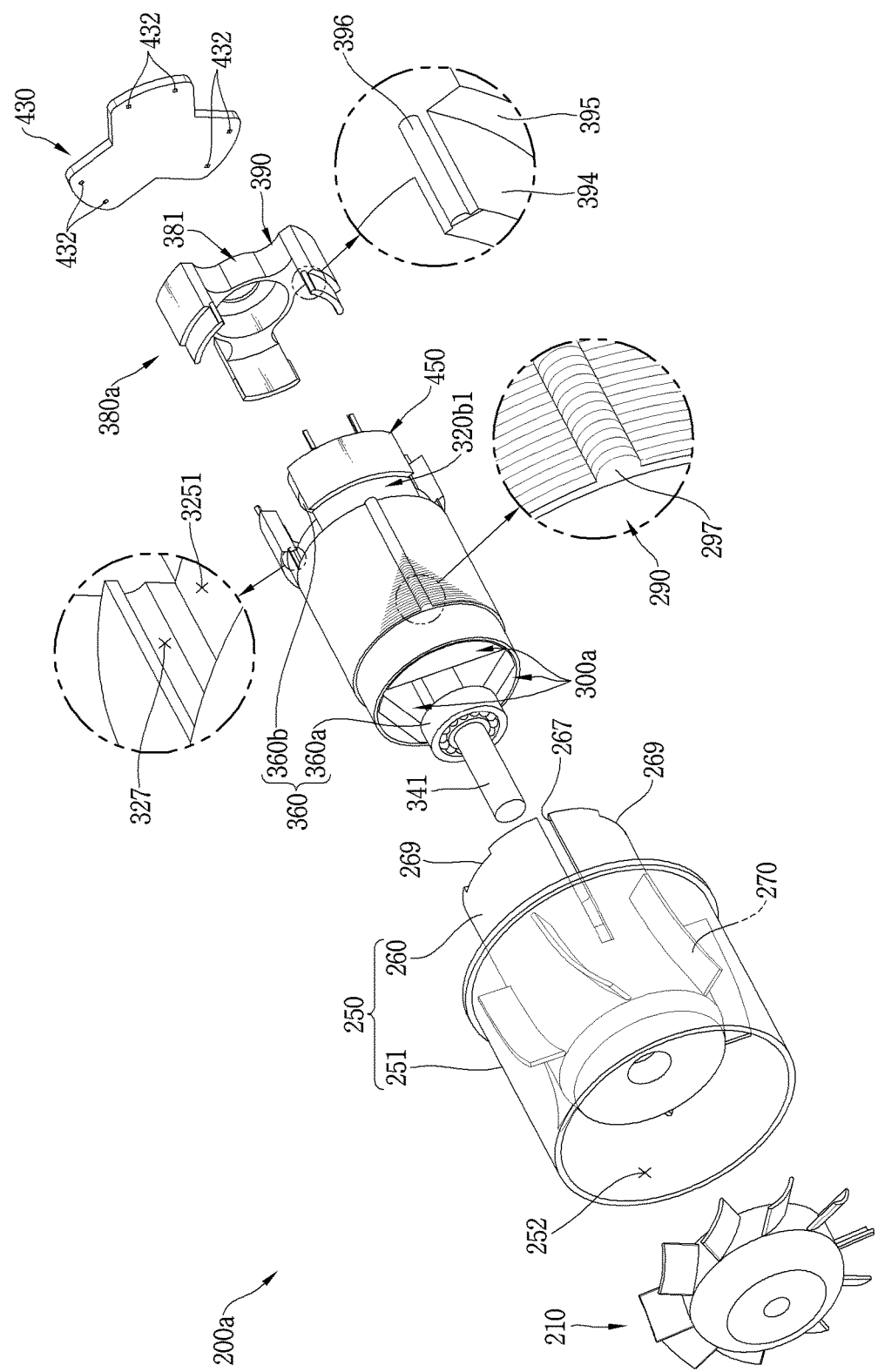
FIG. 8 is a view illustrating a modification of the vortex suppression part and the bracket of FIG. 3.
Figure 9:
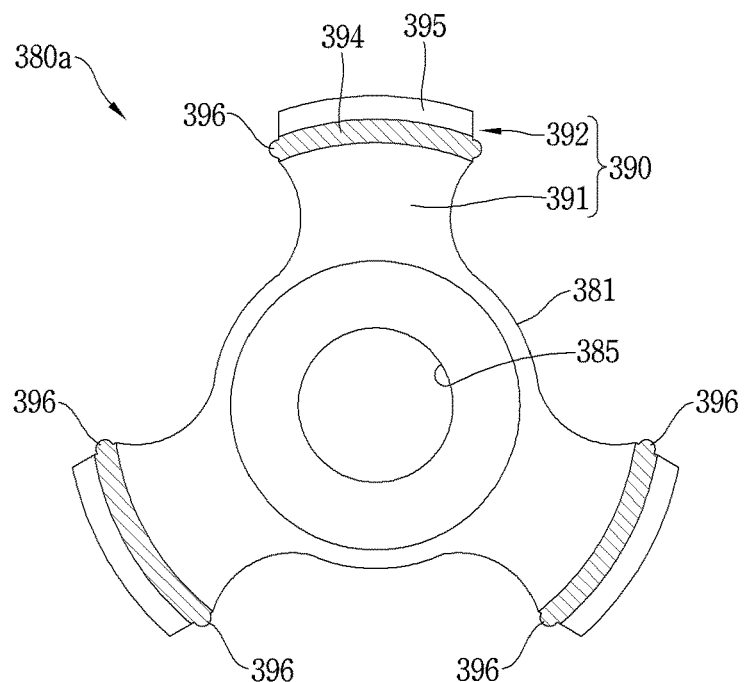
FIG. 9 is a lateral sectional view illustrating the bracket of FIG. 8.
Figure 10:
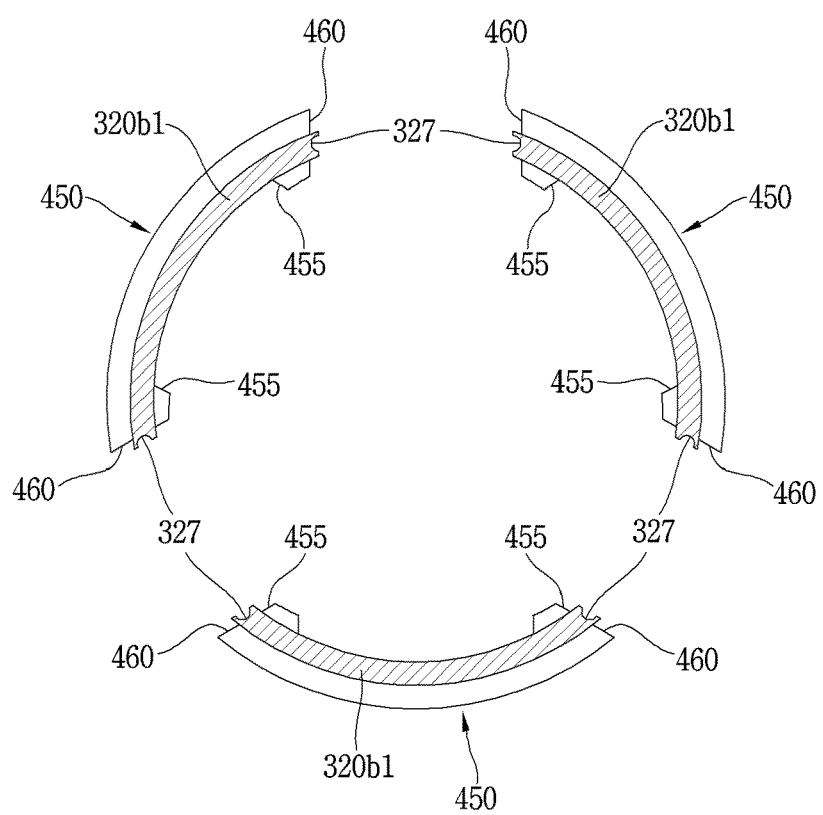
FIG. 10 is a sectional view illustrating the vortex suppression part of FIG. 8.
Figure 11:
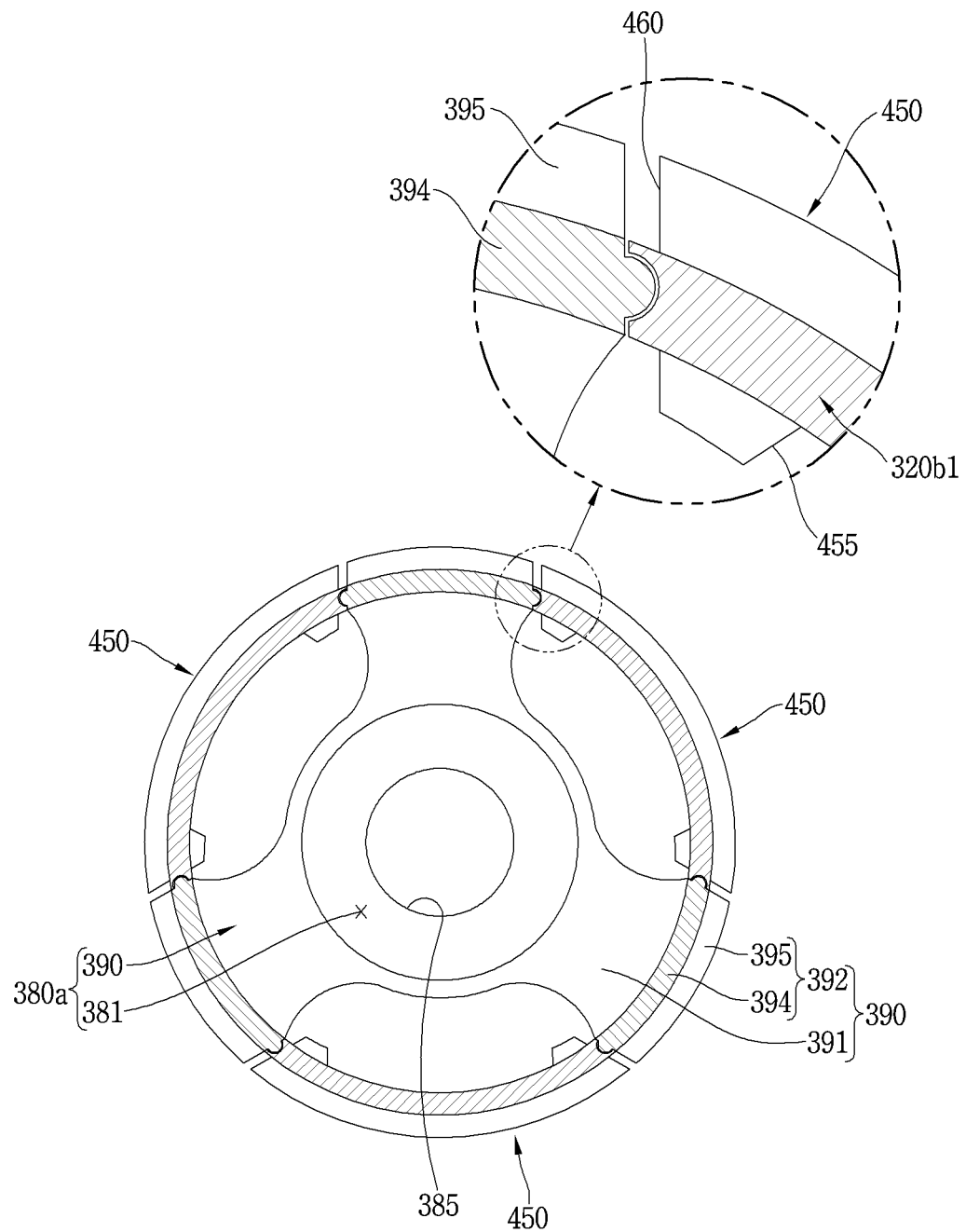
FIG. 11 is a sectional view illustrating a coupled state between the vortex suppression part and the bracket of FIG. 8.

FIG. 8 is a view illustrating a modification of the vortex suppression part and the bracket of FIG. 3, FIG. 9 is a lateral sectional view illustrating the bracket of FIG. 8, FIG. 10 is a sectional view illustrating the vortex suppression part of FIG. 8, and FIG. 11 is a sectional view illustrating a coupled state between the vortex suppression part and the bracket of FIG. 8. As illustrated in FIG. 8, a motor assembly 200a according to another embodiment of the present disclosure includes an impeller 210, a housing 250, an impeller operating part 278, bearings 360, a bracket 380a, and a vortex suppression part 450.

The housing 250 includes an outer housing 251 and an inner housing 260 that are arranged concentrically with each other.

A plurality of guide vanes 270 are disposed between the outer housing 251 and the inner housing 260.

As described above, the bearings 360 include a first bearing 360a and a second bearing 360b respectively disposed on both sides of the rotor 340 in the axial direction.

The impeller operating part 278 includes, for example, a stator 280 and a rotor 340 rotatably disposed with an air gap G with respect to the stator 280 to rotate the impeller 210.

The stator 280, for example, includes a stator core 290, a stator coil 300 wound around the stator core 290, and an insulator part 320 disposed to insulate between the stator core 420 and the stator coil 300.

A bracket 380a for supporting the second bearing 360b is disposed on one side (downstream side) of the rotor 340 in the axial direction.

The bracket 380a includes, for example, a bearing accommodating portion 381 in which the second bearing 360b is accommodated and a plurality of bridges 390 protruding from the bearing accommodating portion 381 in the radial direction and bent to extend in the axial direction.

The plurality of bridges 390 are spaced apart at a uniform angular interval, and provided by three in number.

The insulator part 320 includes vortex suppression parts 450 each extending axially to be located between the adjacent bridges 390 of the bracket 380a.

The vortex suppression part 450 has an arcuate cross-sectional shape.

Wire guides 455 protrude radially inward from an inner side (surface) of each vortex suppression part 450.

The wire guides 455 are respectively formed on both sides of the vortex suppression part 450 along the circumferential direction.

Creepage distance increasing sections 460 are disposed on the vortex suppression parts 450, respectively, to be spaced apart from the bridges 390 of the bracket 380a by preset widths w.

This can increase a creepage distance of the wire 301 that is disposed inside the vortex suppression part 450 and guided by the wire guide 455.

A circumferential length of the vortex suppression part 450 may correspond to a length that is obtained by subtracting twice the width w of the creepage distance increasing section 460 from a circumferential length between the bridges 390 of the bracket 380a.

A pair of connection pins 433 is disposed on the vortex suppression part 450.

A PCB 430 is disposed on one side (downstream side in the flowing direction of air) of the bracket 380a along the axial direction.

The PCB 430 may include, for example, a control program for controlling the operation of the impeller operating unit 278 (the stator 280 and the rotor 340).

The PCB 430 is coupled to each connection pin 433 of the vortex suppression part 450.

On the other hand, the insulator part 320 is provided with bridge insertion portions 3251 in which end portions of the bridges 390 of the bracket 380a are to be inserted.

Each bridge 390 of the bracket 380a is provided with an insertion end portion 394 that can be inserted into the inner housing 260 and the bridge insertion portion 3251 of the insulator part 320.

Each insertion end 394 of the bridge 390 is cut in a thickness direction so that an outer diameter thereof can be reduced.

A protruding end portion 395 is formed on one side of the insertion end portion 394 of each bridge 390 of the bracket 380a.

Bridge coupling portions 269 into which one region (upstream-side end region) of the protruding end portions 395 of the bridges 390 are to be inserted, respectively, are formed by cutting off the inner housing 260.

Meanwhile, circumferential protrusions 396 protrude from any one of contact surfaces between each insertion end portion 394 of the bracket 380a and the bridge insertion portion 3251 of the insulator part 320 in the circumferential direction.

The circumferential protrusions 396 may be formed, for example, on both side surfaces of each insertion end portion 394 of the bridge 390 of the bracket 380a.

The circumferential protrusions 396 may extend in the axial direction.

Circumferential protrusion accommodating portions 327 in which the circumferential protrusions 396 are to be accommodated are formed in another one of the contact surfaces between each insertion end portion 394 of the bracket 380a and the bridge insertion portion 3251 of the insulator part 320.

The circumferential protrusion accommodating portions 327 may be respectively recessed into both side surfaces of the bridge insertion portion 3251 of the insulator part 320.

The circumferential protrusion accommodating portions 327 may extend in the axial direction.

According to this configuration, each insertion end portion 394 of the bridge 390 of the bracket 380a can be coupled to the inside of the bridge insertion portion 3251 of the insulator part 320 at an accurate position.

Accordingly, the insertion end portion 394 of each bridge 390 of the bracket 380a can be smoothly inserted into the inner housing 260 without being stretched outward in the radial direction.

Figure 12:
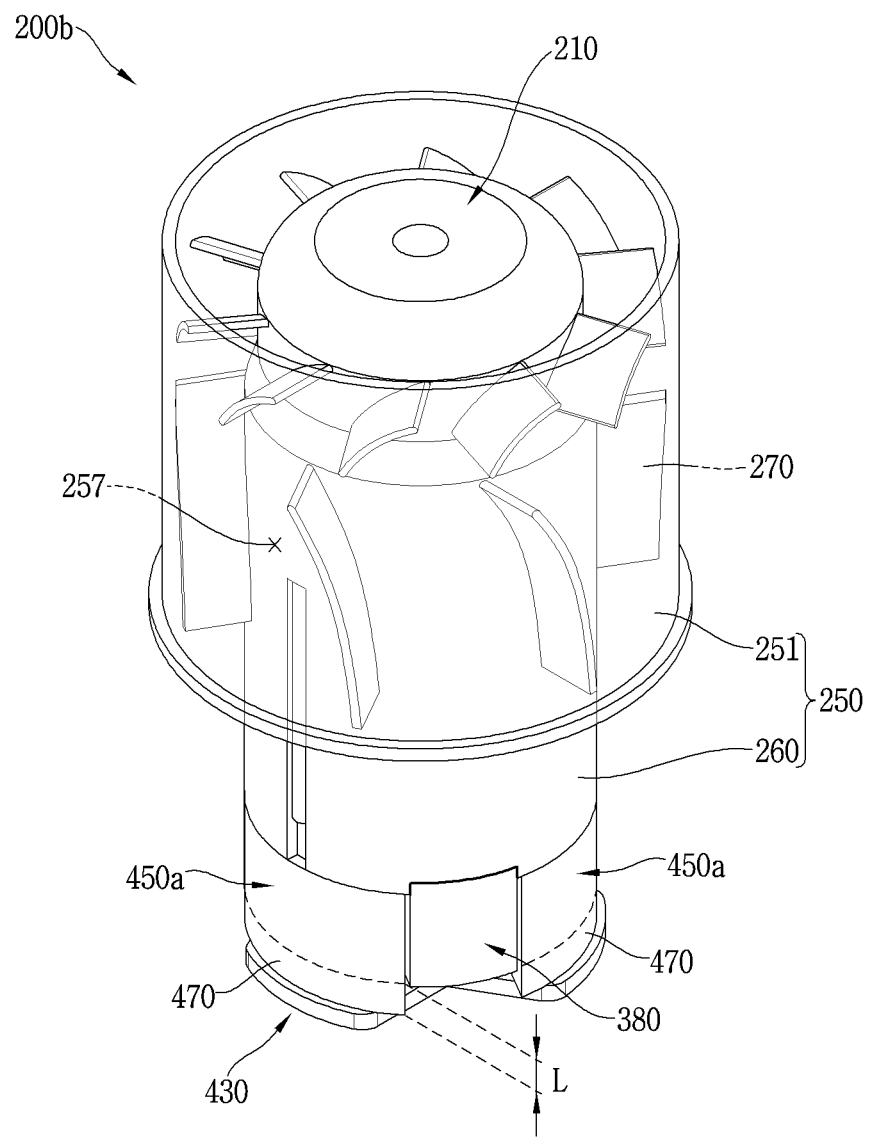
FIG. 12 is a perspective view illustrating a motor assembly in accordance with another embodiment of the present disclosure.
Figure 13:
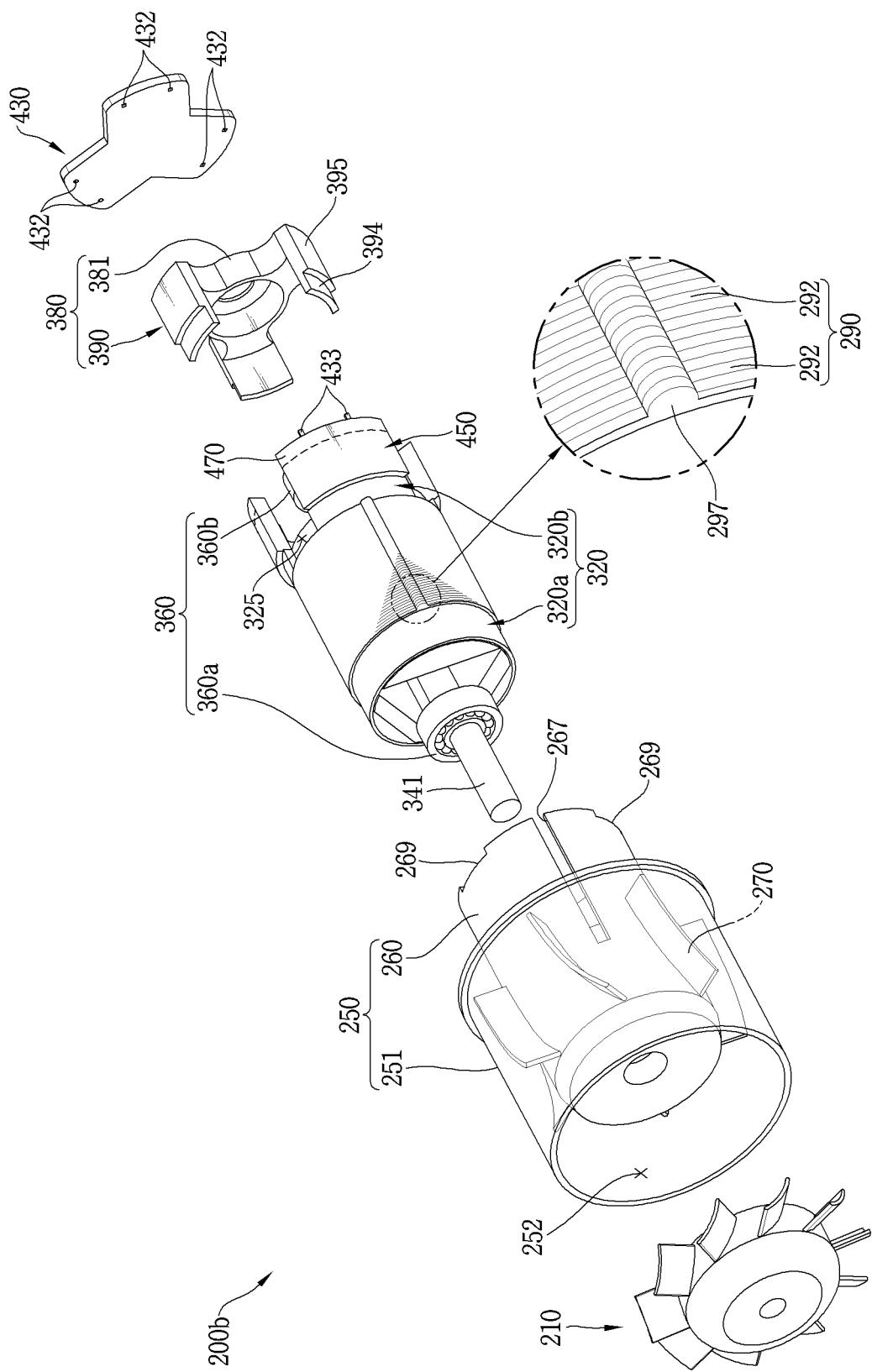
FIG. 13 is an exploded perspective view of FIG. 12.
Figure 14:
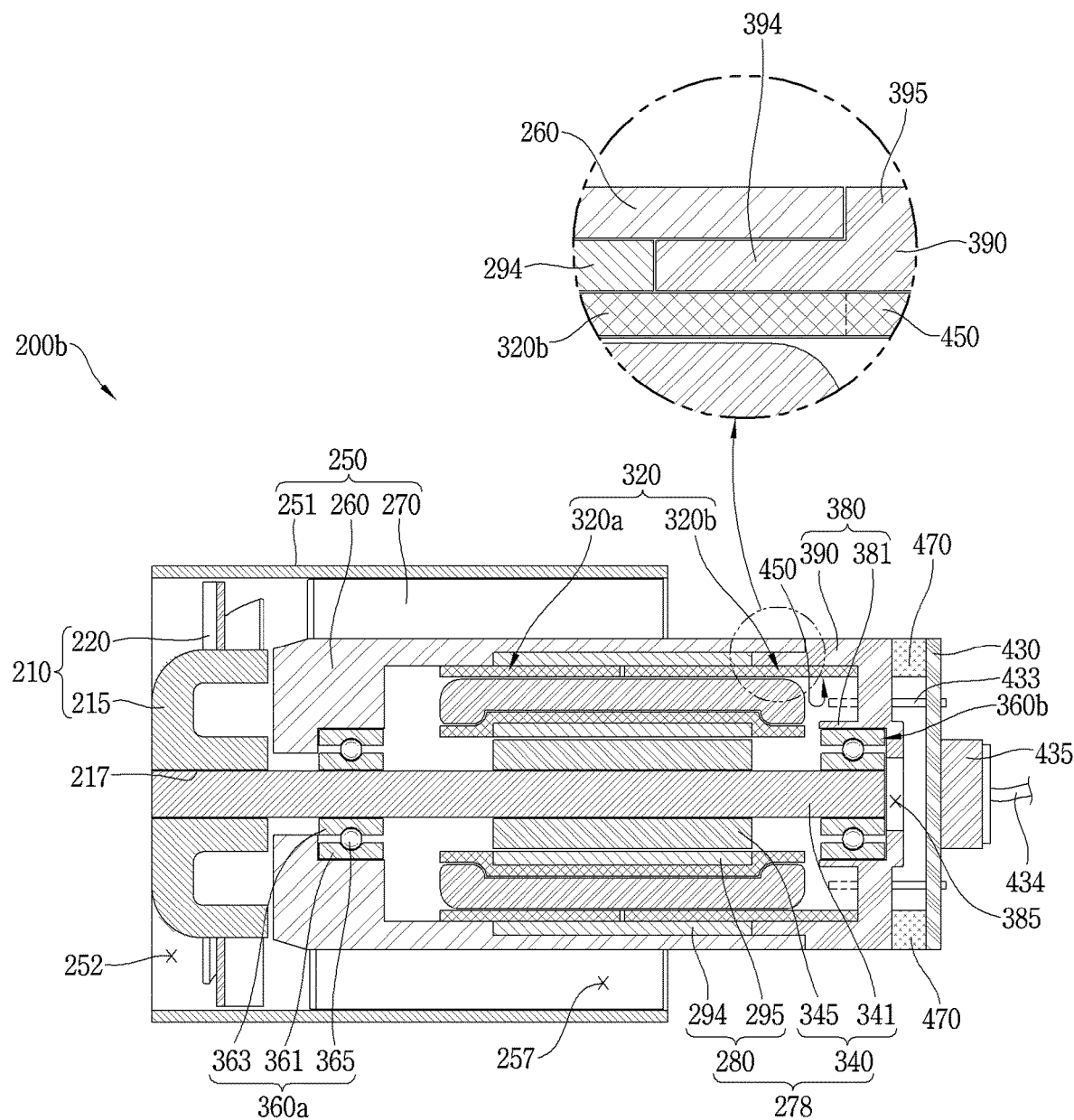
FIG. 14 is a sectional view of FIG. 12.

FIG. 12 is a perspective view illustrating a motor assembly in accordance with another embodiment of the present disclosure, FIG. 13 is an exploded perspective view of FIG. 12, and FIG. 14 is a sectional view of FIG. 12. A motor assembly 200b according to another embodiment of the present disclosure includes an impeller 210, a housing 250, an impeller operating part 278, a bearing 360, a bracket 380, a PCB 430, and a vortex suppression part 450a.

The housing 250 includes an outer housing 251 and an inner housing 260 that are arranged concentrically with each other.

The impeller operating part 278 includes a stator 280 and a rotor 340 disposed with a predetermined air gap G from the stator 280.

The rotor 340 includes a rotating shaft 341 and a permanent magnet 345.

The rotating shaft 341 extends to both sides of the permanent magnet 345.

The rotating shaft 341 is rotatably supported by bearings 360 disposed on both sides of the rotor 340.

The bearings 360 includes a first bearing 360a and a second bearing 360b spaced apart from each other along the axial direction.

The first bearing 360a may be located inside the inner housing 260, for example.

The second bearing 360b may be located at a downstream side of the permanent magnet 345, for example.

The stator 280 and the rotor 340 are accommodated inside the inner housing 260.

The stator 280, for example, includes a stator core 290, a stator coil 300 wound around the stator core 290, and an insulator part 320 disposed to insulate between the stator core 420 and the stator coil 300.

A bracket 380 for accommodating and supporting the second bearing 360b is disposed at a downstream side of the rotor 340 (the permanent magnet 345) along a moving direction of air.

The bracket 380 includes a bearing accommodating portion 381 in which the second bearing 360b is accommodated and a plurality of bridges 390 disposed on a circumference of the bearing accommodating portion 381 with spacings therebetween.

Each of the plurality of bridges 390 includes a radial section 391 protruding radially from the bearing accommodating portion 381, and an axial section 392 bent from the radial section 391 and extending in the axial direction.

On the other hand, the insulator part 320 includes vortex suppression parts 450a to block between the adjacent bridges 390 of the bracket 380 so as to suppress a vortex generation.

Each of the vortex suppression parts 450a has an arcuate cross-sectional surface.

An outer surface of the vortex suppression part 450a has the same outer diameter as that of the inner housing 260.

The vortex suppression part 450a protrudes from the downstream-side end portion of the bracket 380 in the axial direction.

Accordingly, a generation of vortex which may occur when air moved by the impeller 210 moves can be more suppressed.

Here, in an entire section corresponding to a total length of the vortex suppression part 450a, a section that more extends than the downstream-side end portion of the bracket 380 may be referred to as an extension section 470.

An outer surface of the extension section 470 of the vortex suppression part 450a is located on the same line as an outer surface of the vortex suppression part 450a.

A circumferential length of the extension section 470 of the vortex suppression part 450a is the same as a circumferential length of the vortex suppression part 450a.

The vortex suppression part 450a may be formed to have the same thickness over the entire length, or may have different thicknesses.

More specifically, for example, the vortex suppression part 450a is also configured such that a thickness of the extension section 470 disposed at the downstream side of the bracket 380 is thinner than that of a section disposed at an upstream side.

Since the vortex suppression part 450a has the extension section 470 that further extends in the axial direction from the downstream-side end portion of the bracket 380, a vortex, which is generated between the adjacent bridges 390, of vortices generated on an entire circumferential region in the circumferential direction at the downstream side of the bracket 380, can be reduced.

Therefore, an occurrence of flow loss of air moved by the impeller 210 can be further suppressed.

A pair of connection pins 433 protrudes from each vortex suppression part 450a.

The PCB 430 is coupled to end portions of the pair of connection pins 433 of each of the vortex suppression parts 450a.

Wires 301a and 301b of each coil portion 300a of the stator coil 300 are electrically connected respectively to the pair of connection pins 433 of each vortex suppression part 450a.

Figure 15:
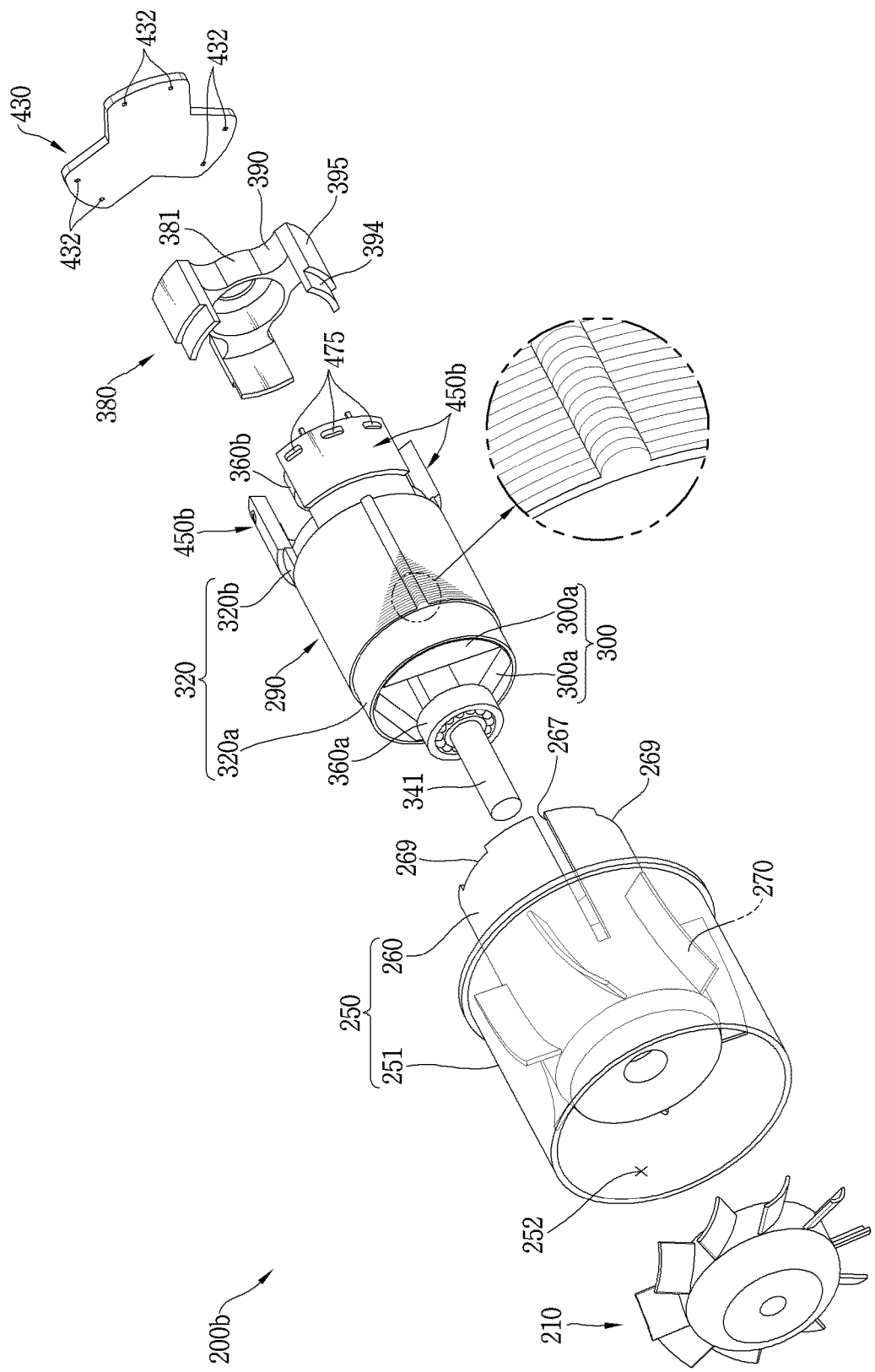
FIG. 15 is a view illustrating a modification of the vortex suppression part of FIG. 12.
Figure 16:
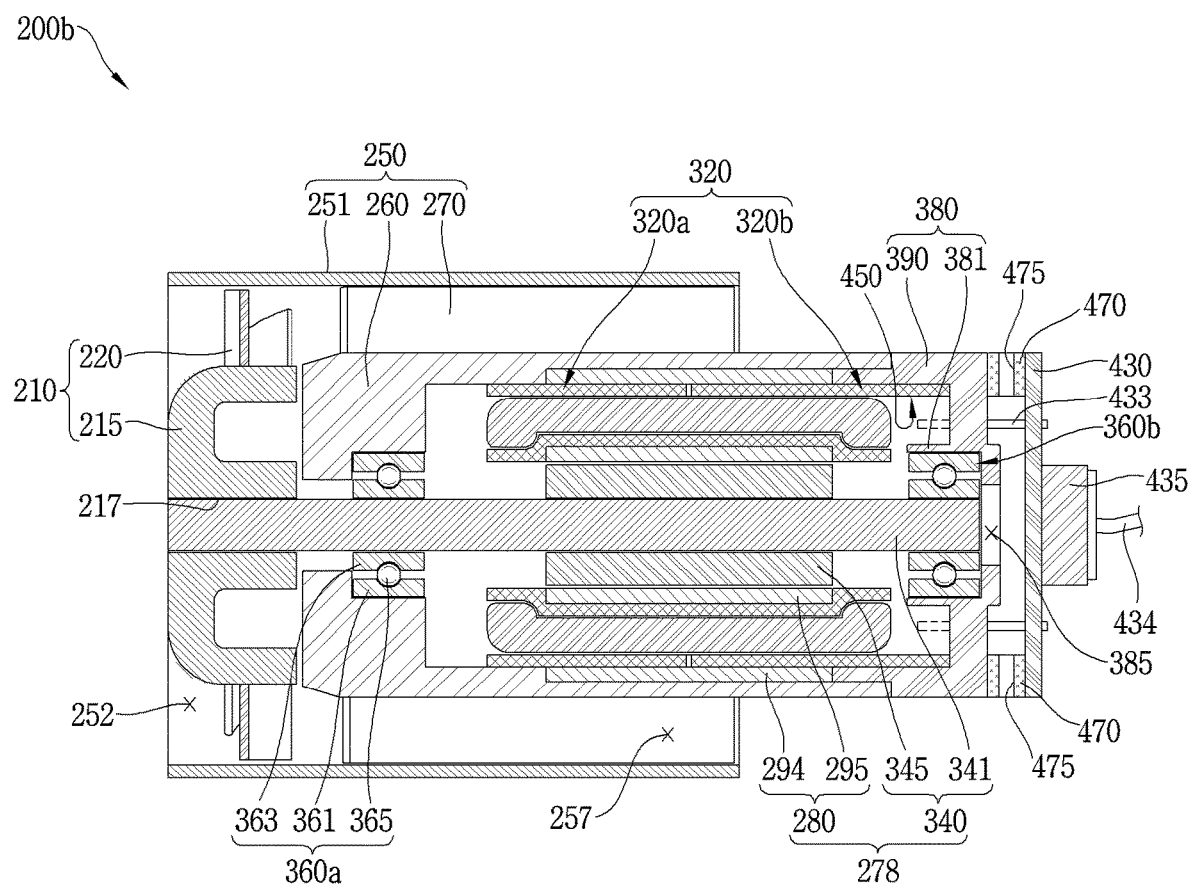
FIG. 16 is a sectional view of FIG. 15.

FIG. 15 is a view illustrating a modification of the vortex suppression part of FIG. 12, and FIG. 16 is a sectional view of FIG. 15. A motor assembly 200b according to this embodiment, as described above, includes an impeller 210, a housing 250, an impeller operating unit 278, a second bearing 360b, a bracket 380, and a vortex suppression part 450b.

As described above, the housing 250 includes an outer housing 251 and an inner housing 260 that are concentrically disposed with each other.

The impeller operating unit 278 includes, for example, a stator 280 accommodated in the inner housing 260, and a rotor 210 disposed with an air gap G from the stator 280 to rotate the impeller 210.

The stator 280, for example, includes a stator core 290, a stator coil 300 wound around the stator core 290, and an insulator part 320 disposed to insulate between the stator core 420 and the stator coil 300.

The bracket 380 for accommodating and supporting the second bearing 360b is disposed at a downstream side of the rotor 340.

The bracket 380 includes, for example, a bearing accommodating portion 381 in which the second bearing 360b is accommodated, and a plurality of bridges 390 formed on the bearing accommodating portion 381.

The insulator part 320 includes vortex suppression parts 450b to block between the adjacent bridges 390 of the bracket 380 so as to suppress a vortex generation.

Each of the vortex suppression parts 450b extends axially from the insulator part 320 to be disposed between the adjacent bridges 390.

Each of the vortex suppression parts 450*b* includes an extension section 470 that further extends in the axial direction from a downstream-side end portion of the bracket 380.

The vortex suppression part 450*b* is disposed so that an outer surface thereof corresponds to an outer diameter surface of the inner housing 260.

A radius of curvature of the outer surface of the vortex suppression part 450*b* is substantially the same as a radius of the inner housing 260.

A pair of connection pins 433 protrudes from each vortex suppression part 450*b*.

The pair of connection pins 433 of each of the vortex suppression parts 450*b* is coupled to the PCB 430.

On the other hand, each of the vortex suppression parts 450*b* includes a through portion 475 formed therethrough such that inside and outside communicate with each other.

This can promote heat exchange between the inside and the outside of the vortex suppression part 450*b*.

With this configuration, heat dissipation of an inner space of the vortex suppression part 450*b* can be promoted.

This can facilitate cooling of the stator 280 and the rotor 340 inside the vortex suppression part 450*b*.

The through portion 475 may be formed through the extension section 470, for example.

This embodiment illustrates an example in which the through portion 475 is formed through the extension section 470. However, this is merely illustrative, and the through portion 475 may alternatively be formed through an upstream-side section of the vortex suppression part 450*b*.

In addition, the through portion 475 may be formed through each of the upstream-side region of the extension section 470 of the vortex suppression part 450 and the extension section 470.

With this configuration, the vortex suppression part 450*b* can suppress a generation of vortex of air moved by the rotation of the impeller 210.

Accordingly, the occurrence of flow loss of the air moved by the impeller 210 can be suppressed. This can suppress a generation of noise due to the vortex generation.

In addition, the through portion 475 may facilitate heat dissipation of the inner space of the vortex suppression part 450*b* (including the extension section 470), thereby maintaining the inner space of the vortex suppression part 450*b* at a relative low temperature.

Figure 17:
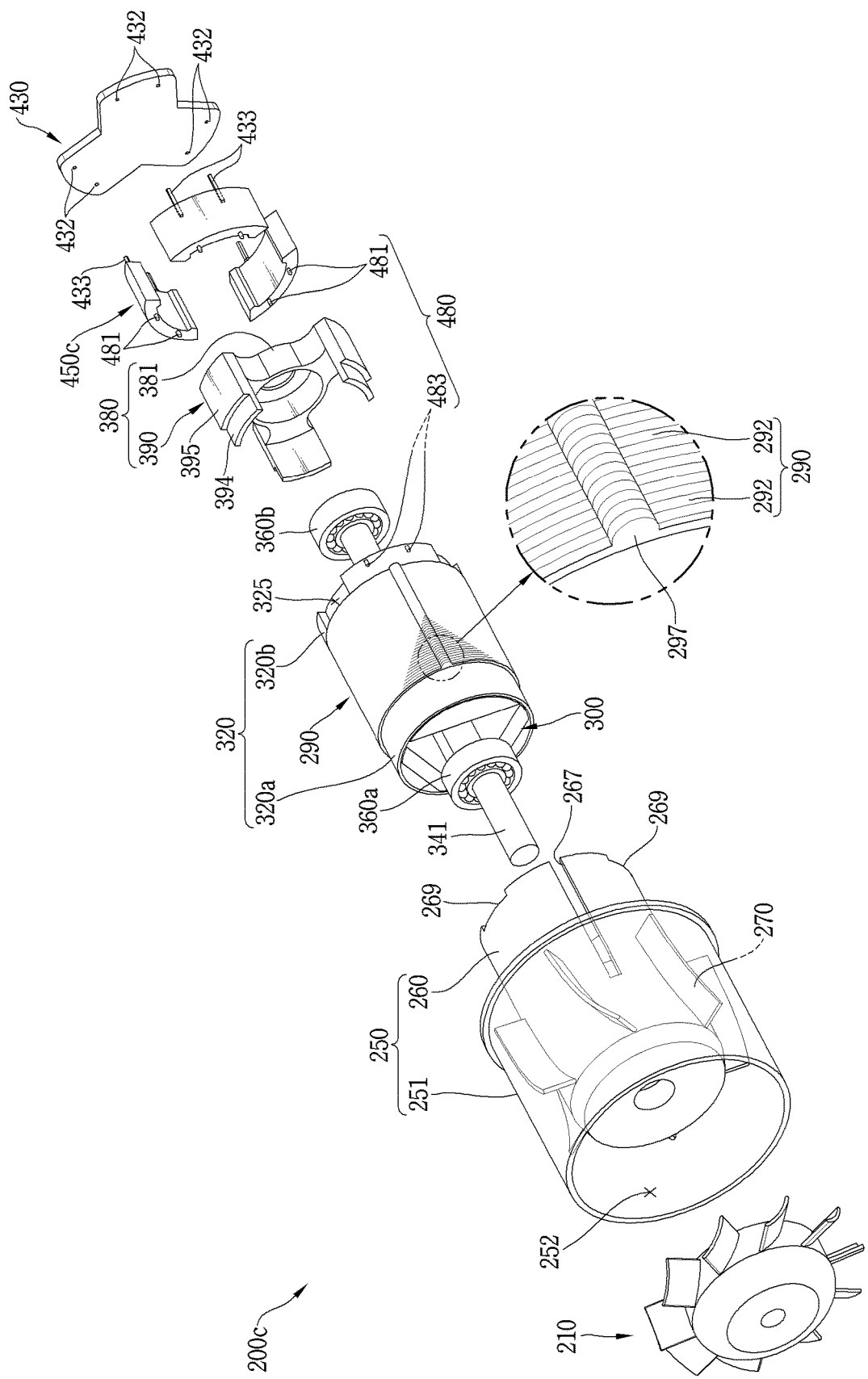
FIG. 17 is an exploded perspective view illustrating a motor assembly in accordance with still another embodiment of the present disclosure.
Figure 18:
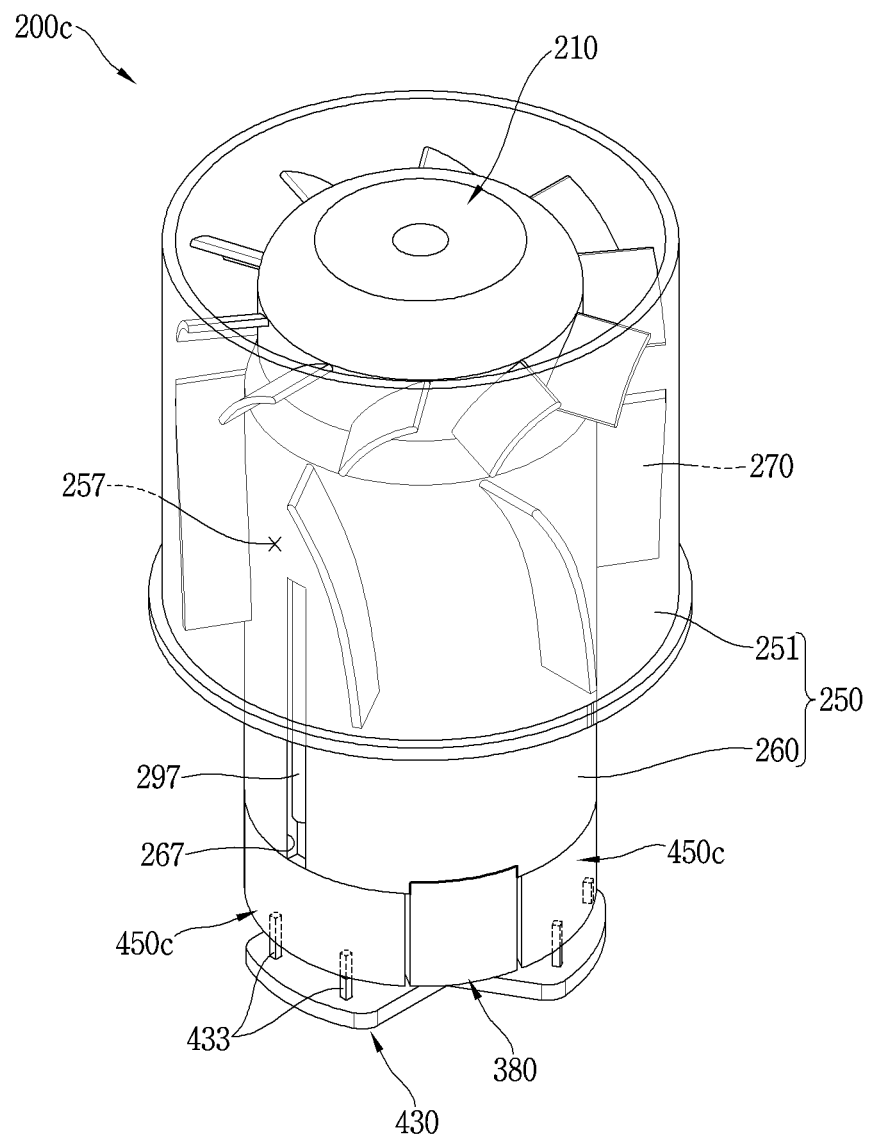
FIG. 18 is a perspective view illustrating a coupled state of FIG. 17.

FIG. 17 is an exploded perspective view illustrating a motor assembly in accordance with still another embodiment of the present disclosure, and FIG. 18 is a perspective view illustrating a coupled state of FIG. 17. As illustrated in FIGS. 17 and 18, a motor assembly 200*c* according to still another embodiment includes an impeller 210, a housing 250, an impeller operating part 278, bearings 360, a bracket 380, a PCB 430, and a vortex suppression part 450*c*.

The impeller 210 and the inner housing 260 are disposed inside the outer housing 251.

One side of the inner housing 260 is disposed inside the outer housing 251 and another side protrudes to the outside of the outer housing 251.

The impeller operating part 278 includes a stator 280 and a rotor 340 rotatably disposed with a predetermined air gap G from the stator 280.

A movement passage 257 of air that is moved by the impeller 210 is defined between the inner housing 260 and the outer housing 251.

The stator 280 and the rotor 340 are accommodated in the inner housing 260.

A coupling protrusion 297 is disposed on an outer surface of the stator core 290.

The coupling protrusion 297 protrudes outward from the outer surface of the stator core 290 in the radial direction and extends in the axial direction. The inner housing 260 is provided with a slot 267 to which the coupling protrusion 297 is accommodated.

The stator 280 includes the insulator part 320 interposed between the stator core 290 and the stator coil 300.

The rotor 340 includes, for example, a rotating shaft 341 and a permanent magnet 345 rotating centering on the rotating shaft 341.

The rotating shaft 341 extends to both sides of the permanent magnet 345.

Bearings 360 that rotatably support the rotating shaft 341 are disposed on both sides of the permanent magnet 345, respectively.

The bearings 360 includes a first bearing 360*a* and a second bearing 360*b*.

The first bearing 360*a* is disposed, for example, at an upstream side of the permanent magnet 345.

The second bearing 360*b* is disposed, for example, at a downstream side of the permanent magnet 345.

The first bearing 360*a* is supported by the inner housing 260 and the second bearing 360*b* is supported by the bracket 380.

The bracket 380 includes, for example, a bearing accommodating portion 381 in which the second bearing 360*b* is accommodated, and a plurality of bridges 390 formed on a circumference of the bearing accommodating portion 381.

The bearing accommodating portion 381 has an outer diameter smaller than an outer diameter of the inner housing 260.

The plurality of bridges 390 include, for example, radial sections 391 protruding in the radial direction from the bearing accommodating portion 381 and spaced apart from one another in the circumferential direction, and axial sections 392 bent from end portions of the radial sections 391 and extending in the axial direction, respectively.

An outer surface of each of the axial sections 392 has an arcuate cross-sectional shape corresponding to the outer diameter of the inner housing 260.

Each of the plurality of bridges 390 includes an insertion end portion 394 that is to be inserted between the inner housing 260 and the insulator part 320 (second insulator 320*b*).

The insertion end portion 394 of each of the bridges 390 is formed by cutting an outer surface of the bridge 390 in a thickness direction so that an outer diameter thereof can be reduced.

The insulator part 320 includes bridge insertion portions 325 in which the insertion end portions 394 of the bridge 390 are to be inserted, respectively.

The bridge insertion portion 325 of the insulator part 320 is recessed in the radial direction so that the outer diameter of the insulator part 320 is reduced.

The bridge insertion portion 325 of the insulator part 320 has one side open along the axial direction.

A protrusion end portion 395 is disposed on the outer surface of each of the plurality of bridges 390 to protrude outward from the insertion end portion in the radial direction.

Bridge coupling portions 269 are disposed in the inner housing 260. One region (upstream-side end region) of the protruding end portion 395 of each of the plurality of bridges 390 is inserted into the bridge coupling portion 269.

Each bridge coupling portion 269 of the inner housing 260 is formed in a cutting manner to have a width corresponding to a width of the corresponding bridge 390 and a preset length in the axial direction.

The PCB 430 is disposed at one side (right side in the drawing) of the bracket 380 in the axial direction.

The PCB 430 includes a control program for controlling the operation of the impeller operating part 278 (the stator 280 and the rotor 340).

The plurality of connection pins 433 that are electrically connected to the stator 280 (the stator coil 300) are coupled to the PCB 430.

The plurality of connection pins 433 are, for example, three pairs spaced apart along the circumferential direction.

One end portion of each of the plurality of connection pins 433 is inserted into the PCB 430.

The PCB 430 includes, for example, a circuit connected to the plurality of connection pins 433.

The plurality of connection pins 433 are provided on each of vortex suppression parts 450c that block between the adjacent bridges 390 of the bracket 380 so as to suppress a vortex generation.

Here, the vortex suppression part 450c may have a length such that a downstream-side end portion thereof is disposed on the same line as the downstream-side end portion of the bracket 380 when the bracket 380 is coupled.

In addition, the vortex suppression part 450c may include an extension section that further extends in the axial direction so as to be located at a more downstream side than the downstream-side end portion of the bracket 380 when the bracket 380 is coupled.

A pair of connection pins 433 protrudes from each vortex suppression part 450c.

The vortex suppression part 450c has an arcuate cross-section.

An outer surface of the vortex suppression part 450c corresponds to an outer diameter of the inner housing 260.

A radius of curvature of the outer surface of the vortex suppression part 450c is the same as a radius of the inner housing 260.

The vortex suppression part 450c includes wire guides 455 for guiding wires (a lead-in side wire 301a and a lead-out side wire 301b) of each coil portion 300a of the stator coil 300.

The wire guides 455 are respectively formed on both sides of the vortex suppression part 450c along the circumferential direction.

The wire guides 455 extend in the axial direction.

The vortex suppression part 450c may include a creepage distance increasing section 460 having both sides spaced apart from the plurality of bridges 390 of the bracket 380 in the circumferential direction.

The wires (the lead-in side wire 301a and the lead-out side wire 301b) of each coil portion 300a of the stator coil 300 are guided by the wire guides 455 and electrically connected to the connection pins 433, respectively.

Each of the vortex suppression parts 450c may be coupled so that an upstream-side end portion is in surface-contact with the downstream-side end portion of the insulator part 320.

The vortex suppression part 450c has an outer diameter larger than an outer diameter of the insulator part 320.

On the other hand, an engagement portion 480 for preventing a lateral movement is disposed in a contact region between the vortex suppression part 450c and the insulator part 320.

Accordingly, the vortex suppression part 450c and the insulator part 320 can be accurately coupled to preset positions.

The engagement portion 480 may include, for example, axial protrusions 481 protruding axially from one of contact surfaces of the insulator part 320 and the vortex suppression part 450c, and axial protrusion accommodating portions 483 disposed on another one of the contact surfaces of the insulator part 320 and the vortex suppression part 450c to accommodate the axial protrusions 481, respectively.

The vortex suppression part 450c and the insulator part 320 may be adhered by, for example, an adhesive. Here, the vortex suppression part 450c and the insulator part 320 (the second insulator 320b) may be coupled to each other by fusion.

The adhesive may be applied to the contact surfaces of the vortex suppression part 450c and the insulator part 320 before adhesion, for example.

Figure 19:
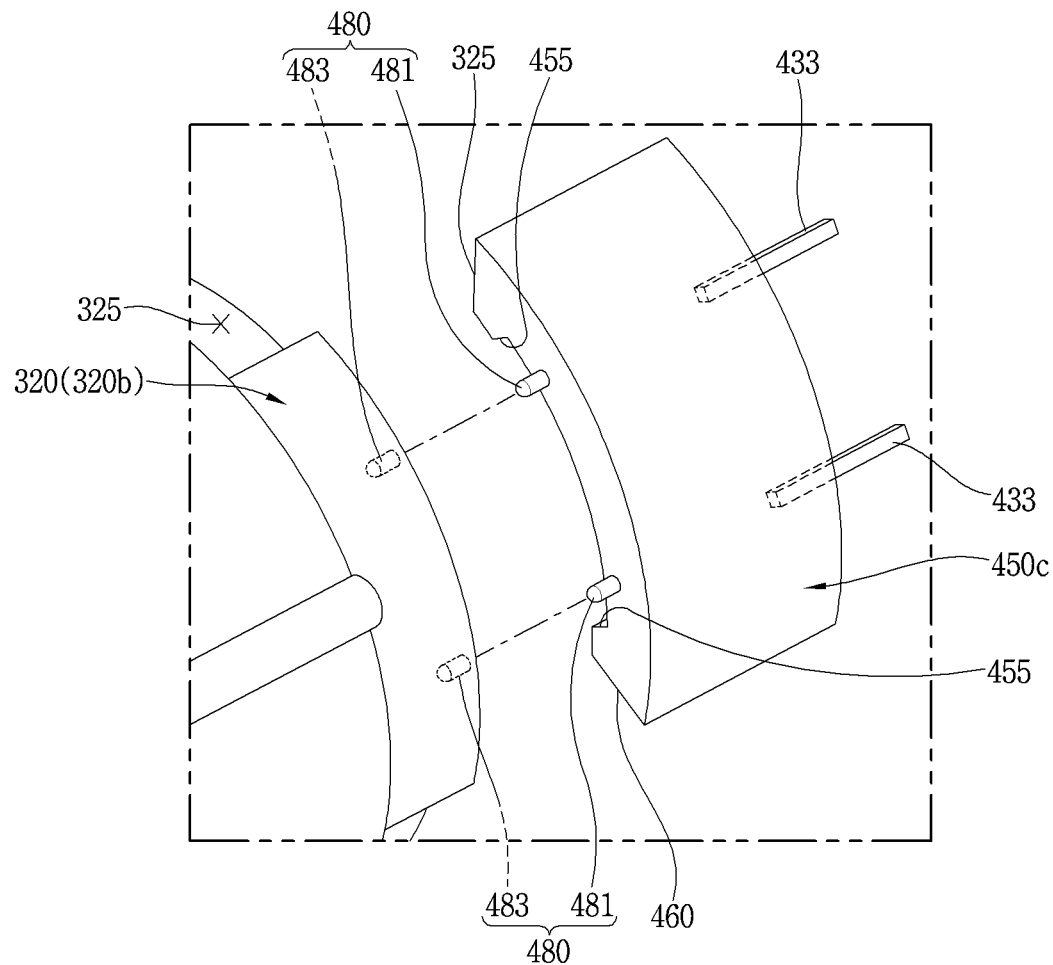
FIG. 19 is an enlarged view illustrating a main part of FIG. 17.
Figure 20:
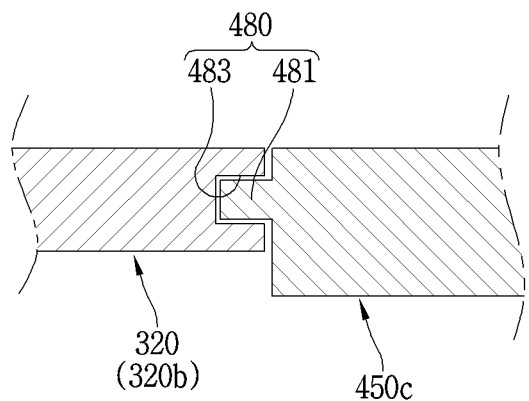
FIG. 20 is a sectional view illustrating a coupled state between an axial protrusion and an axial protrusion accommodating portion of FIG. 19.

FIG. 19 is an enlarged view illustrating a main part of FIG. 17, and FIG. 20 is a sectional view illustrating a coupled state between an axial protrusion and an axial protrusion accommodating portion of FIG. 19. As illustrated in FIGS. 19 and 20, the axial protrusion 481 may protrude in the axial direction from each vortex suppression part 450c, for example.

The axial protrusion 481 may be provided in plurality.

This embodiment illustrates an example in which each vortex suppression part 450c includes two axial protrusions 481. However, this is merely illustrative and the number may alternatively be one or more than three.

The axial protrusions 481 may protrude in the axial direction from the upstream-side end portion of the vortex suppression part 450c, and may be spaced apart from each other in the circumferential direction.

The axial protrusion accommodating portion 483 may be recessed axially into a downstream-side end surface of the insulator part 320, for example.

The axial protrusion accommodating portion 483 is spaced apart from each other along the circumferential direction.

With this configuration, the first bearing 360a and the stator 280 may be accommodated in the inner housing 260. The rotor 340 may be inserted into the stator 280, and the vortex suppression part 450c may be adhered onto the insulator part 320.

When the coupling of the vortex suppression part 450c is completed, the wires 301a and 301b of each coil portion 300a of the stator coil 300 are guided by the wire guides 455 of the corresponding vortex suppression part 450c, so as to be electrically connected to the corresponding connection pins 433, respectively.

When the connection of the wires 301a and 301b and the connection pins 433 is completed, the plurality of bridges 390 of the bracket 380 are disposed in spaces between the adjacent vortex suppression parts 450c in a corresponding manner, such that the bracket 380 can be coupled in the axial direction.

The insertion end portion 394 of each bridge 390 may be inserted between the bridge insertion portion 325 of the insulator part 320 and the inner housing 260.

When the coupling of the bracket 380 is completed, the PCB 430 is coupled to the connection pins 433 provided in each of the vortex suppression parts 450c.

Meanwhile, when the operation is started and the impeller 210 is rotated, air in an upstream region of the outer housing 251 is suctioned into the outer housing 251. The suctioned air moves along the movement passage 257 via the impeller 210.

Air moving along the outer surface of the inner housing 260 moves to the downstream side of the bracket 380 as the vortex generation is suppressed by the vortex suppression part 450c.

Some of the air moved to the downstream side of the vortex suppression part 450c may move to the inside of the vortex suppression part 450c through between the vortex suppression part 450c and the PCB 430.

This can facilitate cooling of the inner space of the vortex suppression part 450c.

So far, those specific embodiments of the present disclosure have been illustrated and described. However, since the present disclosure can be embodied in various forms without departing from the essential characteristics, the implementations described above should not be limited by the specific contents for carrying out the invention.

In addition, even embodiments not listed in the foregoing detailed description should be broadly construed within the scope of the technical idea defined in the appended claims. And, all changes and modifications included within the technical range of the claims and their equivalents should be embraced by the appended claims.

The invention claimed is:

1. A motor assembly comprising:
an impeller;
an outer housing in which the impeller is accommodated at one side;
an inner housing concentrically disposed inside the outer housing and having an air flow path defined outside thereof;
a stator accommodated in the inner housing;
a rotor accommodated in the stator and rotating the impeller;
a bearing supporting a rotating shaft of the rotor;
a bracket having a bearing accommodating portion in which the bearing is accommodated, and a plurality of bridges axially protruding from an outer surface of the bearing accommodating portion with being spaced apart from one another in a circumferential direction, so as to be coupled to the inner housing; and
vortex suppression parts each configured to block an empty space between the bridges adjacent to each other to suppress a generation of vortex of air moved toward the bracket due to the rotation of the impeller.

2. The motor assembly of claim 1, wherein the stator comprises:
a stator core;
a stator coil wound around the stator core; and
an insulator part interposed between the stator core and the stator coil for insulation, and
wherein the vortex suppression parts are disposed on the insulator part.

3. The motor assembly of claim 2, wherein a wire guide is disposed at least one side of each vortex suppression part in the circumferential direction to guide a wire of the stator coil.

4. The motor assembly of claim 3, wherein the wire guide is disposed on each of both sides of the vortex suppression part in the circumferential direction.

5. The motor assembly of claim 3, wherein the vortex suppression part includes a creepage distance increasing section disposed at an outside of the wire guide in the circumferential direction to be spaced apart from the adjacent bridges.

6. The motor assembly of claim 1, wherein an outer surface of the vortex suppression part has an arcuate shape.

7. The motor assembly of claim 1, wherein a radius of curvature of an outer surface of the vortex suppression part corresponds to an outer diameter of the inner housing.

8. The motor assembly of claim 1, further comprising a printed circuit board (PCB) disposed on one side of the bracket in the axial direction,
wherein the PCB and the stator are connected by a plurality of connection pins, and
wherein the plurality of connection pins are coupled through the vortex suppression part.

9. The motor assembly of claim 8, wherein the PCB is disposed to be spaced apart from the vortex suppression part by a preset distance in the axial direction.

10. The motor assembly of claim 9, wherein an end portion of the vortex suppression part is disposed on the same plane as an end portion of the bracket in the axial direction.

11. The motor assembly of claim 8, wherein the vortex suppression part includes an extension section protruding more than the bracket to be close to or in contact with the PCB.

12. The motor assembly of claim 11, wherein the vortex suppression part includes a through portion formed through a planar surface thereof such that inside and outside thereof communicate with each other in a radial direction.

13. The motor assembly of claim 1, wherein each of the plurality of bridges includes an insertion end portion formed by cutting the bridge in a thickness direction so as to be inserted into the inner housing.

14. The motor assembly of claim 1, wherein the stator includes a stator core, a stator coil wound around the stator core, and an insulator part interposed between the stator core and the stator coil to insulate the stator coil, and
wherein the insulator part includes bridge insertion portions into which end portions of the bridges are inserted, respectively.

15. The motor assembly of claim 14, wherein a circumferential protrusion protrudes in the circumferential direction from any one of contact surfaces between the bridge insertion portion and the bridge, and
wherein a circumferential protrusion accommodating portion for accommodating the circumferential protrusion is disposed on another one of the contact surfaces between the bridge insertion portion and the bridge.

16. The motor assembly of claim 1, further comprising a printed circuit board (PCB) having a plurality of connection pins protruding in the axial direction, the PCB disposed on one side of the bracket, and
wherein the vortex suppression part is formed of an electrical insulating member, and has one side to which the plurality of connection pins are coupled and another side coupled to the stator.

17. The motor assembly of claim 16, wherein the stator includes a stator core, a stator coil wound around the stator core, and an insulator part for insulating the stator coil, and
wherein the vortex suppression part is in surface-contact with the insulator part in the axial direction.

18. The motor assembly of claim 17, wherein an axial protrusion protrudes in the axial direction from any one of contact surfaces between the insulator part and the vortex suppression part, and
wherein an axial protrusion accommodating portion for accommodating the axial protrusion is disposed on another one of the contact surfaces between the insulator part and the vortex suppression part.

19. A hair dryer comprising:
a hair dryer body having an air outlet;
a handle having an air inlet and connected to communicate with the hair dryer body; and
the motor assembly according to claim 1, the motor assembly disposed inside the handle.

* * * * *